United States Patent
Bhatti et al.

(10) Patent No.: US 11,582,576 B2
(45) Date of Patent: Feb. 14, 2023

(54) FEATURE-BASED SLAM

(71) Applicant: Apple Inc., Cupertino, CA (US)

(72) Inventors: Jahshan Bhatti, San Jose, CA (US);
Brian Stephen Smith, Campbell, CA (US); Wei Kong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/147,484

(22) Filed: Sep. 28, 2018

(65) Prior Publication Data

US 2019/0373407 A1  Dec. 5, 2019

Related U.S. Application Data

(60) Provisional application No. 62/679,735, filed on Jun. 1, 2018.

(51) Int. Cl.
*H04W 4/02* (2018.01)
*G01C 21/00* (2006.01)
*G06F 16/29* (2019.01)
*H04W 4/33* (2018.01)

(52) U.S. Cl.
CPC .......... *H04W 4/023* (2013.01); *G01C 21/005* (2013.01); *G06F 16/29* (2019.01); *H04W 4/025* (2013.01); *H04W 4/33* (2018.02)

(58) Field of Classification Search
CPC ....... H04W 4/025; H04W 4/023; H04W 4/33; H04W 4/029; H04W 4/30; G06F 16/29; G01C 21/005; G01C 21/206; G01C 21/32
See application file for complete search history.

(56) References Cited

U.S. PATENT DOCUMENTS

| | | | |
|---|---|---|---|
| 6,842,726 B1 | 1/2005 | Scharosch et al. |
| 7,397,424 B2 | 7/2008 | Houri |
| 7,856,234 B2 | 12/2010 | Alizadeh-Shabdiz et al. |
| 7,899,583 B2 | 3/2011 | Mendelson |
| 7,924,149 B2 | 4/2011 | Mendelson |
| 8,054,219 B2 | 11/2011 | Alizadeh-Shabdiz |
| 8,223,074 B2 | 7/2012 | Alizadeh-Shabdiz |
| 8,340,691 B1 | 12/2012 | Starenky et al. |
| 8,369,264 B2 | 2/2013 | Brachet et al. |

(Continued)

FOREIGN PATENT DOCUMENTS

| | | |
|---|---|---|
| WO | WO 2010101551 | 9/2010 |
| WO | WO 2011/077166 | 6/2011 |

(Continued)

OTHER PUBLICATIONS

Mirowski, Amendment to the specification "Supporting the Creating of a Radio Map", Apr. 1, 2015. (Year: 2015).*

(Continued)

*Primary Examiner* — Brandon J Miller
(74) *Attorney, Agent, or Firm* — Aikin & Gallant, LLP

(57) ABSTRACT

Embodiments are disclosed for a feature-based simultaneous localization and mapping (SLAM) system and method that generates radio maps for environments that are not accessible for surveying. More accurate radio maps are generated for an unsurveyed environment by determining a best estimate of a mobile device state from harvested traced data that maximizes a posterior probability of the mobile device state given measurements, landmarks and loop constraints.

18 Claims, 10 Drawing Sheets

(56) References Cited

U.S. PATENT DOCUMENTS

| | | |
|---|---|---|
| 8,478,297 B2 | 7/2013 | Morgan et al. |
| 8,694,366 B2 | 4/2014 | Barnes, Jr. |
| 8,775,065 B2 | 7/2014 | Gupta et al. |
| 8,836,580 B2 | 9/2014 | Mendelson |
| 8,866,673 B2 | 10/2014 | Mendelson |
| 8,896,485 B2 | 11/2014 | Mendelson |
| 8,938,255 B2 | 1/2015 | Tsruya et al. |
| 8,941,485 B1 | 1/2015 | Mendelson |
| 8,983,493 B2 | 3/2015 | Brachet et al. |
| 9,020,687 B2 | 4/2015 | Mendelson |
| 9,148,764 B2 | 9/2015 | Das et al. |
| 9,198,003 B2 | 11/2015 | Marti et al. |
| 9,204,251 B1 | 12/2015 | Mendelson |
| 9,204,257 B1 | 12/2015 | Mendelson |
| 9,301,100 B1 | 3/2016 | Jampani et al. |
| 9,304,970 B2 | 4/2016 | Wirola et al. |
| 9,432,813 B2 | 8/2016 | Ahn et al. |
| 9,532,184 B2 | 12/2016 | Marti et al. |
| 9,584,981 B2 | 2/2017 | Noorshams et al. |
| 9,641,814 B2 | 5/2017 | Wirola et al. |
| 9,668,146 B2 | 5/2017 | Lau |
| 9,769,622 B2 | 9/2017 | Patel |
| 10,240,995 B2* | 3/2019 | Le Grand ............... G01S 19/01 |
| 10,429,487 B1* | 10/2019 | Fowe ..................... G01S 19/12 |
| 10,477,609 B2 | 11/2019 | Yang et al. |
| 2002/0147754 A1 | 10/2002 | Dempsey et al. |
| 2007/0001904 A1 | 1/2007 | Mendelson et al. |
| 2008/0077326 A1 | 3/2008 | Funk et al. |
| 2010/0039929 A1 | 2/2010 | Cho et al. |
| 2011/0018732 A1 | 1/2011 | Cho et al. |
| 2011/0090081 A1 | 4/2011 | Khorashadi et al. |
| 2011/0112768 A1 | 5/2011 | Doyle |
| 2011/0231357 A1 | 9/2011 | Cho et al. |
| 2011/0241882 A1 | 10/2011 | Gonzales et al. |
| 2011/0274000 A1 | 11/2011 | King et al. |
| 2012/0015665 A1 | 1/2012 | Farley et al. |
| 2012/0029817 A1 | 2/2012 | Khorashadi et al. |
| 2012/0064855 A1 | 3/2012 | Mendelson |
| 2012/0072106 A1 | 3/2012 | Han et al. |
| 2012/0143495 A1 | 6/2012 | Dantu et al. |
| 2012/0191512 A1 | 7/2012 | Wuoti et al. |
| 2012/0203453 A1 | 8/2012 | Lundquist et al. |
| 2012/0245839 A1 | 9/2012 | Syed et al. |
| 2012/0274642 A1 | 11/2012 | Ofek et al. |
| 2013/0066550 A1 | 3/2013 | Takada et al. |
| 2013/0150076 A1 | 6/2013 | Kim et al. |
| 2013/0151139 A1 | 6/2013 | Park et al. |
| 2013/0179075 A1 | 7/2013 | Haverinen et al. |
| 2013/0281111 A1 | 10/2013 | Syrjarinne et al. |
| 2013/0336138 A1 | 12/2013 | Venkatraman et al. |
| 2014/0073345 A1 | 3/2014 | Chintalapudi |
| 2014/0107918 A1 | 4/2014 | Friedler et al. |
| 2014/0114561 A1 | 4/2014 | Pakzad |
| 2014/0128100 A1 | 5/2014 | Sridhara et al. |
| 2014/0129136 A1 | 5/2014 | Celia |
| 2014/0148196 A1 | 5/2014 | Bassan-Eskenazi et al. |
| 2014/0162693 A1 | 6/2014 | Wachter et al. |
| 2014/0171098 A1 | 6/2014 | Marti et al. |
| 2014/0171114 A1 | 6/2014 | Marti |
| 2014/0213294 A1 | 7/2014 | Marti et al. |
| 2014/0213298 A1 | 7/2014 | Marti et al. |
| 2014/0235266 A1 | 8/2014 | Edge et al. |
| 2014/0274136 A1 | 9/2014 | Edge et al. |
| 2014/0324590 A1 | 10/2014 | Kong et al. |
| 2014/0335887 A1 | 11/2014 | Liu |
| 2014/0335893 A1 | 11/2014 | Ronen et al. |
| 2014/0335900 A1 | 11/2014 | Farris |
| 2014/0355592 A1 | 12/2014 | Camps et al. |
| 2014/0361927 A1 | 12/2014 | Jarvis et al. |
| 2015/0043362 A1 | 2/2015 | Sankar et al. |
| 2015/0045054 A1 | 2/2015 | Emadzadeh et al. |
| 2015/0052460 A1 | 2/2015 | Mohammad Mirzaei et al. |
| 2015/0080020 A1 | 3/2015 | Edge et al. |
| 2015/0119086 A1* | 4/2015 | Mirowski ............ G01C 21/206 455/456.6 |
| 2015/0195682 A1 | 7/2015 | Lee et al. |
| 2015/0245180 A1 | 8/2015 | Lin et al. |
| 2015/0281910 A1 | 10/2015 | Choudhury et al. |
| 2015/0296342 A1 | 10/2015 | Boukallel et al. |
| 2015/0308839 A1 | 10/2015 | Jiang |
| 2015/0346317 A1 | 12/2015 | Patel |
| 2016/0080911 A1 | 3/2016 | Kay et al. |
| 2016/0094951 A1* | 3/2016 | Yang ..................... H04W 4/029 455/456.1 |
| 2016/0161252 A1 | 6/2016 | Yasui |
| 2016/0178726 A1 | 6/2016 | Wirola et al. |
| 2016/0295372 A1 | 10/2016 | Kapicioglu et al. |
| 2016/0360380 A1 | 12/2016 | Huang et al. |
| 2016/0371394 A1 | 12/2016 | Shahidi et al. |
| 2017/0006434 A1 | 1/2017 | Howe |
| 2017/0134910 A1 | 5/2017 | Gu et al. |
| 2017/0295458 A1 | 10/2017 | Gao et al. |
| 2017/0328716 A1* | 11/2017 | Ma ....................... G06K 9/6249 |
| 2017/0343639 A1 | 11/2017 | Ivanov |
| 2017/0359697 A1 | 12/2017 | Bhatti |
| 2018/0025500 A1 | 1/2018 | Nielsen |
| 2018/0035258 A1 | 2/2018 | Pon et al. |
| 2018/0098196 A1* | 4/2018 | Dal Santo ............... H04L 67/02 |
| 2018/0109910 A1 | 4/2018 | Cerchio |
| 2018/0120116 A1* | 5/2018 | Rombouts .............. G01C 21/32 |
| 2018/0123708 A1 | 5/2018 | Khalajmehrabadi et al. |
| 2018/0255430 A1* | 9/2018 | Ivanov .................. G01S 5/0252 |
| 2018/0275261 A1 | 9/2018 | Khan |
| 2018/0302751 A1 | 10/2018 | Coutinho et al. |
| 2018/0352379 A1 | 12/2018 | Kong et al. |
| 2019/0041488 A1 | 2/2019 | Ivanov |
| 2019/0354850 A1 | 11/2019 | Watson et al. |
| 2019/0373413 A1 | 12/2019 | Kong et al. |

FOREIGN PATENT DOCUMENTS

| | | |
|---|---|---|
| WO | WO 2011144967 | 11/2011 |
| WO | WO 2011144968 | 11/2011 |
| WO | WO 2012038779 | 3/2012 |
| WO | WO 2013/110971 | 8/2013 |
| WO | WO 2016206717 | 12/2016 |

OTHER PUBLICATIONS

International Search Report and Written Opinion in International Application No. PCT/US2015/032736, dated Sep. 11, 2015, 13 pages.

PCT Invitation to Pay Additional Fees in International Application No. PCT/US2019/035027, dated Oct. 2, 2019, 16 pages.

PCT International Search Report and Written Opinion in International Appln. No. PCT/US2019/035027, dated Nov. 27, 2019, 21 pages.

* cited by examiner

FEATURE-BASED SLAM

CROSS-RELATED APPLICATIONS

This application claims the benefit of priority of U.S. Provisional Patent Application No. 62/679,735, filed Jun. 1, 2018, for "Feature-Based SLAM," which provisional patent application is incorporated by reference herein in its entirety.

TECHNICAL FIELD

The disclosure generally relates to extending a radio map.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. In many places where a mobile device does not have a line of sight with GPS satellites, GPS location determination can be error prone. For example, a conventional mobile device often fails to determine a location or determines a location with poor accuracy based on GPS signals when the device is inside a building or tunnel. For example, areas with obstructing buildings can diminish line of sight of the GPS signals and introduce error. In addition, even if a mobile device has lines of sight with multiple GPS satellites, error margin of GPS location can be in the order of tens of meters. Such error margin may be too large for determining on which floor of a building the mobile device is located, in which room of the floor the mobile device is located, on which side of a street the mobile device is located, on which block the mobile device is located, etc.

SUMMARY

Embodiments are disclosed for a feature-based simultaneous localization and mapping (SLAM) system and method that generates radio maps for environments that are not accessible for surveying. More accurate radio maps are generated for an unsurveyed environment by determining a best estimate of a mobile device state from harvested traced data that maximizes a posterior probability of the mobile device state given measurements, landmarks and loop constraints.

In an embodiment, a method comprises: receiving, by one or more processors, a first set of trace data from a first mobile device operating in an environment, the first set of trace data describing a first set of states of a first trajectory of the first mobile device in the environment, the first set of trace data including a first set of wireless access point data and a first set of sensor measurements collected by the first mobile device while operating in the environment; receiving, by the one or more processors, a second set of trace data from a second mobile device operating in the environment, the second set of trace data describing a second set of states of a second trajectory of the second mobile device in the environment, the second set of trace data including a second set of wireless access point data and a second set of sensor measurements collected by the second mobile device while operating in the environment; determining, by the one or more processors, a first location constraint based on at least one of the first or second set of sensor measurements; determining, by the one or more processors, a second location constraint based on at least one of signal strength measurements in the first or second set of wireless access point data or a similarity between the first and second sets of wireless access point data; and generating, by the one or more processors, a radio map based on the first and second location constraints.

Other embodiments are directed to systems, apparatuses and non-transitory, computer-readable mediums.

Particular implementations may provide one or more of the following advantages. Feature-based SLAM allows radio maps to be generated for environments that are not accessible for surveying. More accurate radio maps are generated for unsurveyed environments using posterior probabilities computed from wireless network access point data and sensor measurements collected from mobile devices operating in the environment.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
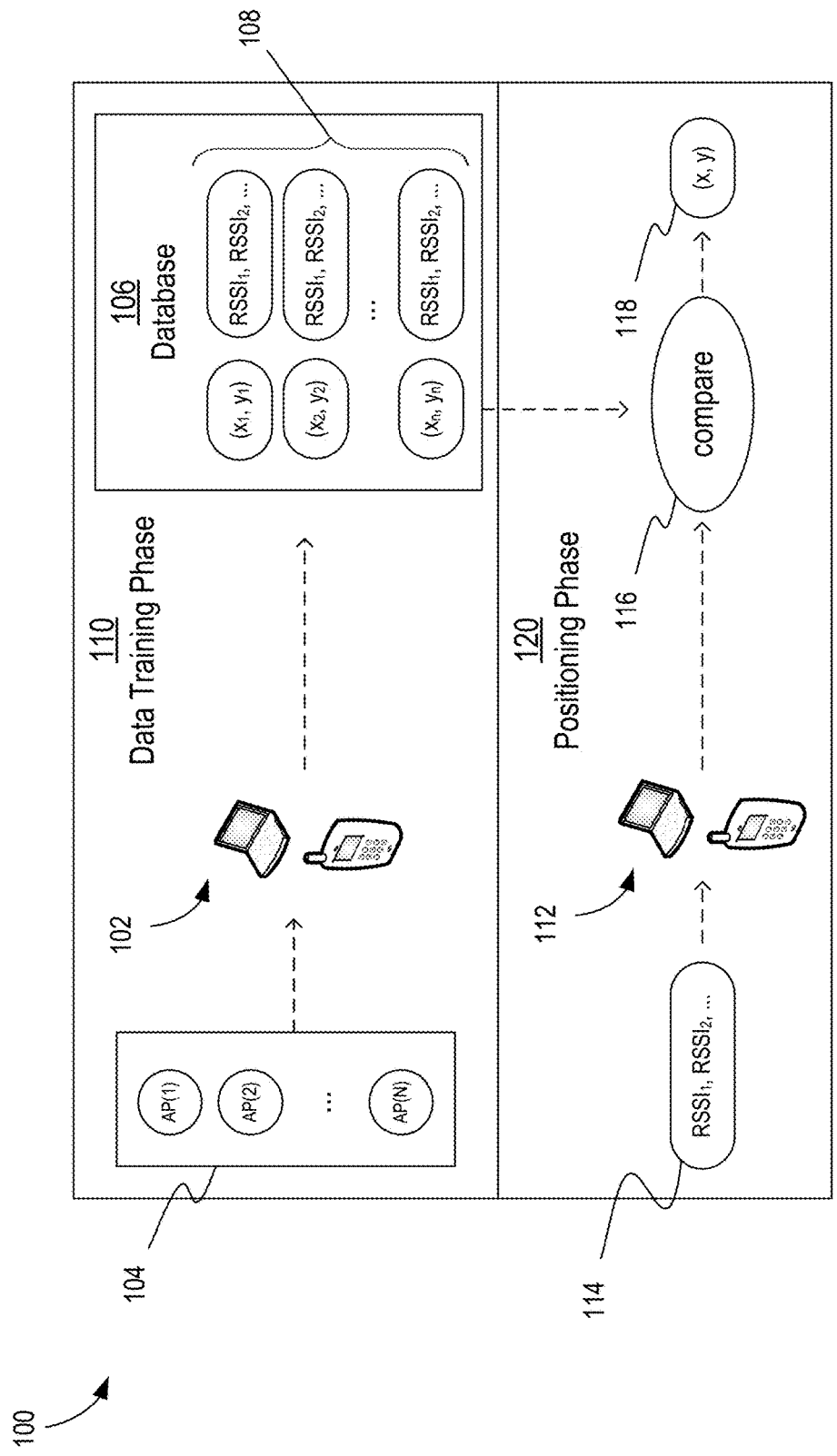
FIG. 1 is a block diagram illustrating a surveying technique for determining positioning.

Indoor positioning systems can use wireless local-area network (WLAN) (e.g., Wi-Fi) infrastructure to allow a mobile device to determine its position in an indoor venue, where other techniques such as GPS may not be able to provide accurate and/or precise position information. Such Wi-Fi-based positioning systems typically involve at least two phases—a data training phase and a positioning phase. During the data training phase (e.g., sometimes referred to as the surveying phase), a mobile survey device is positioned at various reference points throughout the venue. In some implementations, the reference points are predetermined locations within the venue for which positioning information is desired. The predetermined locations (e.g., for which the data training phase is performed) can later be identified as a current location of a device when a subsequent positioning phase is performed on the device. In some implementations, the actual locations of the reference points may not be predetermined, but may instead be determined according to one or more rules and/or criteria. For example, a first reference point may be defined at a particular location of the venue (e.g., at an entrance of the venue), and additional reference points may be defined at a particular distance interval (e.g., every 10 meters) in one or more particular directions, as described in more detail below.

An operator of the survey device (e.g., a surveyor) may travel to a first reference point within the venue and provide an input on a user interface of the survey device to indicate the position of the first reference point relative to the venue. For example, the surveyor may drop a pin on an indoor map representation of the venue. The surveyor may then cause the survey device to gather a plurality of measurements. In particular, the survey device determines all access points (APs) (e.g., wireless APs) that the survey device is in communication with and measures the received signal strength indicators (RSSIs) of each of the signals received from each of the APs. For each reference point, a plurality (e.g., hundreds) of RSSI measurements are obtained for each AP. Measurements may be obtained at a set interval (e.g., every few seconds). Measurements may be obtained over multiple days and under different conditions, such as under different climate conditions, different venue conditions (e.g., when the venue is highly populated, slightly populated, and unpopulated), different times of day, and/or different physical venue conditions (e.g., different combinations of doors and/or windows within the venue being open or closed, etc.). The surveyor may then travel to a second reference point and repeat the procedure, and so on until a comprehensive number of reference points within the venue have been gathered. The full set of measurements for all APs at all reference points within the venue are stored in a database (e.g., a fingerprint database). The collection of measurements is sometimes referred to as a "location fingerprint" of the venue. At this stage, the location data included in the database may be largely survey data (e.g., measurements obtained by the survey device during the data training phase).

In some implementations, the location data may be obtained using one or more techniques other than the surveying technique described above. For example, other source data may be obtained and used to provide the location fingerprint of the venue. In general, the location fingerprint is based on source data that is deemed to be high quality and accurate data (e.g., data that correlates RSSI measurements to corresponding positions to a relatively high degree of accuracy). Other types of source data that can be used to create the location fingerprint (and, e.g., a radio map) are described below.

The positioning phase occurs after the training phase has at least partially been completed. During the positioning phase, a mobile device (e.g., a mobile device separate from the survey device) at a particular location within the venue may attempt to determine its location. The mobile device performs a scan of all APs in communication range of the mobile device and obtains RSSI measurements for signals received from each AP. The RSSI measurements are compared to the various measurements included in the location fingerprint and a match is determined (e.g., on a server, such as a "cloud" server). For example, the RSSI measurements obtained by the mobile device may be similar to the RSSI measurements that were obtained by the survey device at a particular reference point, and as such, the mobile device may determine that it is located at the particular reference point. The mobile device may identify the location that corresponds to particular reference point (e.g., the location that was dropped as a pin on the map by the surveyor) and provide that particular location as the current location of the mobile device. Additional details about the matching process are described below. Such matching techniques typically employ a "probabilistic approach" in which the mobile device determines the reference point for which there exists the highest probability that the mobile device is located at.

The data training phase and the positioning phase are sometimes collectively referred to as a surveying technique for determining indoor positioning. The location fingerprint obtained by the survey device can generally be referred to as survey data. Such surveying techniques typically provide an accurate estimation of the location of the mobile device within the venue provided the mobile device is located near a reference point. However, one disadvantage of such surveying techniques is that they require the prior surveying (e.g., data training) of a venue. If a particular portion of a venue is not surveyed (e.g., in other words, if no reference point data is obtained for locations at or proximate to a particular portion of a venue), then it may be difficult to determine the location of the mobile device when the mobile device is located proximate to such areas, or in some cases, the location determination may be relatively inaccurate. Such shortcomings may exist when the mobile device is positioned near portions of the venue that are restricted to the surveyor, such as private rooms and/or stores, restricted access locations, etc.

In some implementations, additional location data may be added to the fingerprint database to supplement the initial location fingerprint survey data. For example, harvest data (e.g., harvest traces) that are obtained in and/or around the venue may be considered for addition to the fingerprint database. Data that is obtained by enlisting a relatively large number of people is sometimes referred to as harvest data. A collection of data used to determine one or both of a position and a motion of a device (e.g., over a period of time) is sometimes referred to as "trace" data, or generally as a "trace." Therefore, a collection of motion and/or position data obtained by enlisting a relatively large number of people may be referred to as harvest trace data, or generally, harvest traces. Each element of harvest data can be a sample point (e.g., a location where data is sampled) including sensor measurements obtained by the device, with the collection of sample points making up a harvest trace.

In general, harvest data is obtained by enlisting a relatively large number of people via an online medium. For example, users who run a particular operating system and/or application on their mobile device may contribute harvest traces to an operator of the operating system and/or application. The harvest data can be provided to services that can use the harvest data for various purposes. For example, a plurality of users may agree to contribute harvest traces while running a mapping application on their mobile device. In some implementations, the user may be required to "opt-in" before harvest traces can be contributed (e.g., to protect the privacy of the user). An operator of a different service or application, such as an operator of an indoor positioning system, may receive the harvest data from an operator of the mapping application and use the harvest data to improve the indoor positioning system, as described herein.

A harvest trace may include data that is used to identify a location of a mobile device as well as RSSI measurements for one or more of the APs observed during the data training phase. For example, a harvest trace may be used to identify an ending location of the mobile device as the mobile device travels from a known starting location (e.g., a location that corresponds to one of the surveyed reference points) to an unknown ending location (e.g., a location inside a store for which survey data was not obtained). The harvest trace may include pedestrian dead reckoning (PDR) data collected by the mobile device such as pedometer measurements, position and/or orientation measurements obtained from a gyroscope, accelerometer, and/or a compass, barometer measurements, etc. The ending location of the mobile device is identified using the PDR data, and the ending location is correlated with the RSSI measurement for the one or more of the APs observed when the mobile device is positioned at the ending location. The result is a new location data point (e.g., a new reference point) that correlates an unsurveyed location to AP RSSI measurements.

The harvest trace data can be added to the fingerprint database. In some implementations, the harvest trace data may undergo one or more filtering stages to ensure that the data added to the fingerprint database will have a positive effect (e.g., increase the accuracy of indoor location determinations for the mobile device). The harvest trace data may be added in a manner such that the harvest trace data has a similar schema as the survey data collected during the data collection phase by the survey device. The effect of adding such harvest trace data to the fingerprint database is that a radio map that represents the venue (which is described in more detail below) can be extended. In this way, the radio map may be updated to improve already-surveyed areas and/or extended to cover unsurveyed areas, including but not limited to indoor locations that were restricted to the surveyor and/or outdoor locations proximate to the venue, thereby providing additional areas in and/or around the venue for which the location of a device can be determined with improved accuracy. Thus, when we talk about extending the radio map, we mean that devices located in the extended area may be able to accurately determine their respective location due to the inclusion of the harvest trace data in the form of new reference points.

FIG. 1 shows a block diagram illustrating a surveying technique 100 for determining positioning (e.g., indoor positioning within a venue). The technique 100 includes a data training phase 110 and a positioning phase 120.

During the data training phase 110, a survey device 102 (e.g., a mobile computing device such as a mobile phone, laptop, PDA, etc.) is positioned at various reference points throughout the venue. The survey device 102 may include a user interface that is configured to display a map representation of the venue. In some implementations, a grid may be overlaid over the map of the venue. The grid can be made up of cells (e.g., square cells, such as cell 312 of FIG. 3) having the same or similar dimensions. The cells may be three meters by three meters, ten meters by ten meters, etc. The venue map may be obtained from a venue map database. The venue map may include representations of multiple floors of the venue, including outer boundaries of the venue, indoor obstructions (e.g., walls), etc. When the survey device 102 is positioned at a particular reference point (e.g., within one of the cells), an operator of the survey device 102 (e.g., a surveyor) can drop a pin on the venue map indicating the particular position of the reference point that is being tested. The position may be associated with an (x, y) coordinate which may, in some cases, correspond to latitude/longitude coordinates.

The surveyor can bring the survey device 102 to a first reference point within the venue. The reference point is a location within the venue for which a plurality of measurements (e.g., Wi-Fi measurements) is to be obtained. Characteristics of the measurements can be obtained and stored. At some later time, a mobile device (e.g., other than the survey device 102) may obtain measurements at the reference point or at a location proximate to the reference point. In general, and as described in more detail below, the characteristics of the measurements obtained by the mobile device can be compared to the characteristics of the stored measurements that were obtained by the survey device 102. If the characteristics are similar, the mobile device may determine that it is positioned at the first reference point (e.g., within the same cell as the first reference point).

The survey device 102 is positioned at various reference points throughout the venue. Also positioned throughout the venue are a plurality of access points (APs) 104. The APs 104 may be radio frequency (RF) signal transmitters that allow Wi-Fi compliant devices to connect to a network, and in some cases, the APs 104 may be part of Wi-Fi routers. At each reference point, the survey device 102 may connect to (e.g., transmit wireless signals between) each of a plurality of APs 104. The survey device 102 measures one or more characteristics of the wireless signals received from each AP 104. For example, when the survey device 102 is positioned at the first reference point (e.g., $x_1$, $y_1$), the surveyor may drop a pin on the venue map displayed on the survey device 102 to indicate the location of the first reference point ($x_1$, $y_1$) within the first cell. The survey device 102 may be connected to four APs 104—AP(1), AP(2), AP(3), and AP(4). Each of the APs 104 may be associated with an identifier such as a media access control (MAC) address that the survey device 102 can use to identify the particular AP 104. The survey device 102 can measure characteristics of signals received from each AP 104, such as the received signal strength indicator (RSSI). The RSSI can be measured for multiple wireless signals received from each AP 104. The results are stored in a database 106. The database 106 is sometimes referred to as a fingerprint database, and the data stored in the database 106 is sometimes referred to as survey data.

A plurality of measurements may be obtained for each AP 104. For example, for each AP 104, a wireless signal may be received at set intervals (e.g., every second) and the RSSI may be measured for each wireless signal. The wireless signals may be received and the RSSI may be measured under different conditions. For example, tens or hundreds of measurements may be taken during a first period with the survey device 102 in a first orientation. The orientation of the survey device 102 may be adjusted, and additional measurements may be taken. Measurements may be taken when the venue is occupied with a relatively large number of people, when the venue is largely empty, when the venue is completely empty, etc. Measurements may be taken when indoor obstructions, doors, etc. are in various open/closed states. Measurements may be taken under different climate conditions. The measurements may be taken under such a wide variety of circumstances to provide a relatively large data set for the particular reference point that is comprehensive and includes the variety of circumstances that may exist when a mobile device subsequently tries to determine its location in the positioning phase 120.

Once a sufficient number of measurements are obtained for the first reference point that is located at ($x_1$, $y_1$), an entry 108 for the first reference point ($x_1$, $y_1$) is stored in the database 106. The entry 108 (e.g., sometimes referred to as an element of survey data or an entry 108 of survey data) includes the coordinates of the reference point and the various RSSI measurements for each of the APs 104. The survey device 102 can be positioned at a second reference point ($x_2$, $y_2$) at a second cell of the grid overlaid on the map of the venue, and a similar process can be repeated to obtain an entry 108 for the second reference point ($x_2$, $y_2$), which can likewise be stored in the database 106. The collection of survey data entries 108 stored in the database 106 is sometimes referred to as the "location fingerprint" of the venue.

The positioning phase 120 occurs after at least some of the location fingerprint of the venue (e.g., the entries 108 stored in the database 106) has been obtained. During the positioning phase 120, a mobile device 112 (e.g., which is typically different than the survey device 102) that is located at the venue may attempt to determine its location. In a similar fashion as that described above with respect to the data training phase 110, the mobile device 112 receives wireless signals from one or more of the APs 104 positioned throughout the venue. The mobile device 112 can measure characteristics of the received wireless signals. For example, the mobile device 112 may obtain RSSI measurements 114 of wireless signals received from each of the various APs 104. The RSSI measurements 114 are compared 116 to the location fingerprint (e.g., the survey data) stored in the database 106, and based on the comparison, a location 118 of the mobile device 112 is determined.

Multiple different techniques may be used for comparing 116 the location fingerprint stored in the database 106 to the RSSI measurements 114. In some implementations, a probabilistic approach is used. The location fingerprint (e.g., the plurality of data included in the various survey data entries 108) can be used to create RSSI probability distributions of all APs 104 at all reference points.

Figure 2:
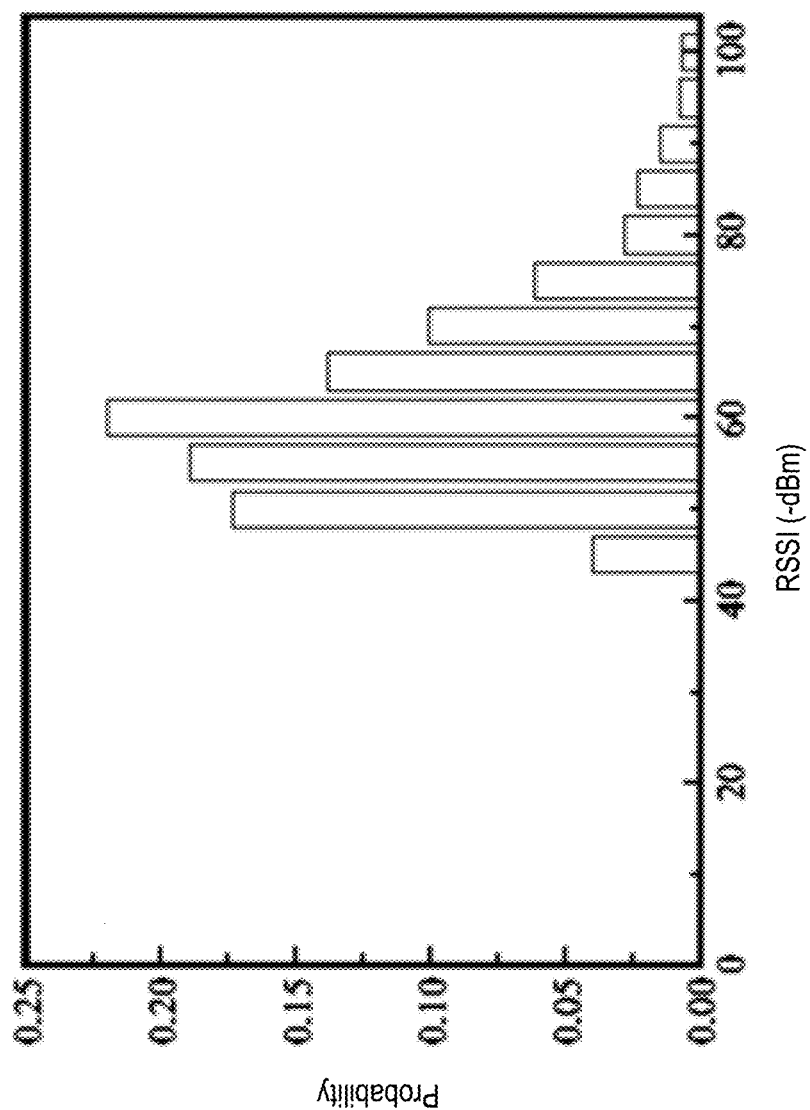
FIG. 2 shows an example of an RSSI probability distribution graph used in the surveying technique of FIG. 1.

FIG. 2 shows an example of an RSSI probability distribution graph 200 that includes, for example, all RSSI measurements (e.g., which are included in the survey data entries 108 stored in database 106) obtained from one of the APs 104 (e.g., AP(1)) at the first reference point ($x_1$, $y_1$). In other words, while FIG. 1 shows that the database 106 includes a single RSSI measurement for AP(1) at the first reference point ($x_1$, $y_1$), which is denoted at $RSSI_1$ in the first entry 108, in practice, a relatively large number of RSSI measurements are typically taken and included in the database 106.

The various RSSI measurements taken during the data training phase 110 can be used to infer a probability that a device positioned at or near the particular reference point ($x_1$, $y_1$) will receive a signal having a particular RSSI value from the particular AP(1). In this example, the RSSI probability distribution graph 200 may include hundreds of RSSI measurements that were obtained by the survey device 102 based on wireless signals received from AP(1) when the survey device 102 was positioned at the first reference point ($x_1$, $y_1$). The number of measurements taken during the data training phase 110 having the various particular RSSI values corresponds to the probability that a future measurement taken by a device (e.g., the mobile device 112) will have the various particular RSSI values when the device is positioned at the first reference point ($x_1$, $y_1$).

In this example, the RSSI probability distribution graph 200 indicates that a device positioned at the first reference point ($x_1$, $y_1$) should most often receive a wireless signal from AP(1) that has an RSSI value of about 60-dBm. In particular, a device positioned at the first reference point ($x_1$, $y_1$) should receive a wireless signal from AP(1) that has an RSSI value of about 60-dBm about 22% of the time. Therefore, during the positioning phase 120, if the mobile device 112 receives a wireless signal from AP(1) that has an RSSI value of about 60-dBm, there is a reasonable probability that the mobile device 112 is located at the first reference point ($x_1$, $y_1$).

In practice, the probabilistic approach typically includes other considerations than the brief example described above. For example, the RSSI probability distribution graph 200 shown in FIG. 2 only corresponds to a single one of the APs 104 at a single one of the reference points. In practice, the RSSI probability distributions for all APs 104 at all reference points will be determined and stored in the database 106. When the position of the mobile device 112 is determined during the positioning phase 120 by comparing 116 the location fingerprint (e.g., expressed as RSSI probability distributions) to the RSSI measurements 114, a plurality of comparisons 116 are performed to find a match (e.g., the best match). For example, the RSSI measurement 114 that corresponds to AP(1) (e.g., RSSI') is compared to the RSSI probability distributions for AP(1) for each of the reference points, the RSSI measurement 114 that corresponds to AP(2) (e.g., $RSSI_2$) is compared to the RSSI probability distributions for AP(2) for each of the reference points, etc., and a collective comparison 116 is performed to determine the best collective match.

In an example, once a RSSI probability distribution of measurements is obtained for each of the APs 104 at each of the reference points, the data are fit to a particular probability distribution having a particular probability density function, such as a Rayleigh distribution. A Rayleigh distribution is characterized by the probability density function:

$$f(x; \sigma) = \frac{x}{\sigma^2} e^{-x^2/(2\sigma^2)}$$

where x is the RSSI and σ is the shape parameter. Using the survey data entries 108 obtained for each AP 104 at each of the reference point, a Rayleigh distribution is created for each of the APs 104 at each reference points. For each probability density function, the value for σ is based on the RSSI measurements of the survey data entries 108 obtained during the data training phase 110.

Subsequently during the positioning phase 120, when the mobile device 112 is positioned at an unknown position, the RSSI measurement 114 for each AP 104 can be entered into each probability density function for the corresponding AP 104, where each probability density function corresponds to one of the reference points. For example, the RSSI measurement 114 for AP(1) is entered into the probability density function for AP(1) at reference point #1, the probability density function for AP(1) at reference point #2, etc. Each probability density function returns a probability expressed as a value between 0 and 1. The RSSI measurement 114 for AP(2) is entered into the probability density function for AP(2) at reference point #1, the probability density function for AP(2) at reference point #2, etc. This process may be repeated for all probability density functions for all APs 104 at all reference points. In some implementations, other techniques may be employed to minimize the number of computations that must take place. For example, reference points that are very far away from a previously-determined location, or reference points that require a relatively long path of travel due to being located behind a lengthy barrier, may be discounted because it may be impossible for the mobile device 112 to travel such a large distance in the interval of time between location determinations.

Once all probabilities are computed, the probabilities that correspond to reference point #1 are multiplied together. For example, the probability for the RSSI measurement 114 that corresponds to AP(1) (e.g., $RSSI_1$) at reference point #1 is multiplied by the probability for $RSSI_2$ at reference point #1, multiplied by the probability for $RSSI_3$ at reference point #1, etc. The probabilities that correspond to reference point #2, reference point #3, etc. are similarly multiplied together. The reference point that gives the highest cumulative probability is identified as the location for which there is the highest likelihood that the mobile device 112 is located. Such a probabilistic approach is sometimes referred to as a maximum likelihood test.

In some implementations, a weighted averaging technique may be used for the comparison 116 to determine the best collective match. For a particular comparison 116, each of the APs 104 may be assigned a level of importance. The APs 104 of relatively higher importance are weighted more heavily in the weighted average, and the APs 104 of relatively lower importance are weighted less heavily in the weighted average. For example, if a particular AP 104 (e.g., AP(5)) is assigned the highest level of importance, and the RSSI measurement 114 that corresponds to AP(5) (e.g., $RSSI_5$) provides a relatively high probability value for the probability density function for AP(5) at a particular reference point, then there may be a high likelihood that the particular reference point is chosen as the best match. On the other hand, if a particular AP 104 (e.g., AP(8)) is assigned the lowest level of importance, then even if the RSSI measurement 114 that corresponds to AP(8) (e.g., $RSSI_8$) provides a relatively high probability value for the probability density function for AP(8) at a particular reference point, the match may have a minimal effect on the comparison decision, and there may be a low likelihood that the particular reference point is chosen as the best match.

In some implementations, the level of importance used in the weighted average may be based at least in part on the magnitude of the RSSI measurements 114 that correspond to the various APs 104. For example, it may be inferred that stronger RSSI measurements 114 are more accurate because the user is likely closer to those corresponding APs 104. Therefore, the APs 104 that correspond to the stronger RSSI measurements 114 may be more heavily weighted in the weighted average.

Figure 3:
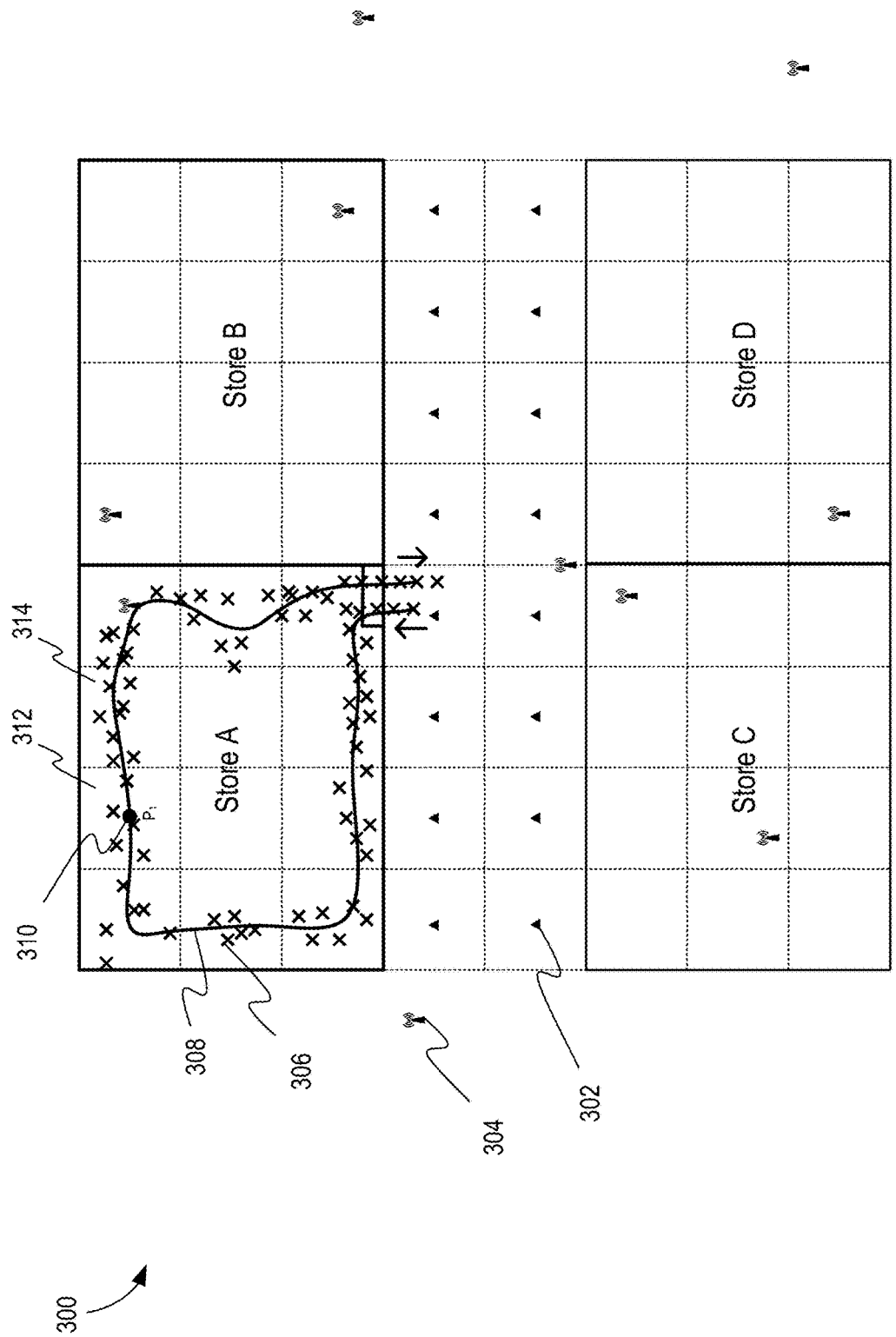
FIG. 3 shows an example of a radio map for a venue.

In some implementations, the venue and areas in proximity to the venue may be expressed as a graphical map, sometimes referred to as a radio map. The radio map is associated with the survey data obtained during the data training phase 110, as well as other location data, as described in more detail below. The term radio map originates from the association of the graphical map with such location data that is based on characteristics of radio signals (e.g., Wi-Fi signals). FIG. 3 shows an example of a radio map 300 for a venue (e.g., a mall) that includes at least four stores, Store A-D. The surveying technique described above with respect to FIG. 1 may be employed in the mall.

During the data training phase 110, a surveyor may bring a survey device (e.g., the survey device 102 of FIG. 1) to each of a plurality of reference points 302, represented as black triangles in the illustration. The reference points 302 may be located in generally accessible areas of the venue, such as hallways, concourses, lobbies, etc. In some implementations, a grid may be overlaid over the map of the mall. The grid can be made up of cells. In some implementations, some or all of the cells are square cells having the same or similar dimensions (e.g., between three meters by three meters and ten meters by ten meters, although smaller or larger dimensions can also be used). In some implementations, the grid may be made up of cells of various shapes and sized.

The cells have the effect of binning data obtained by the survey device 102. The cells can also be used as a visual aid for the surveyor to indicate locations for which survey data is to be obtained. For example, the survey device 102 may include a user interface that is configured to display the radio map 300 (or, e.g., a modified version of the radio map) with the overlaid grid. Once the surveyor is positioned at a particular reference point 302 (e.g., within one of the cells), he or she may provide an input through the user interface (e.g., a touch input) to indicate the location of the reference point 302 to be tested. For example, the surveyor may drag and drop a pin into the corresponding cell on to the radio map 300 to indicate the particular reference point 302 at which the survey device 102 is currently positioned.

A plurality of APs 304 (e.g., such as the APs 104 of FIG. 1) may be distributed throughout the mall. The APs 304 may be positioned in hallways/corridors of the mall, in the stores, outside of the mall, etc. Once the survey device 102 is positioned at the particular reference point 302 to be tested, the survey device 102 may obtain a plurality of measurements from the various APs 304. For example, the survey device 102 may perform a scan to determine which APs 304 the survey device 102 is in wireless communication with. If the survey device 102 receives one or more signals from a particular AP 304, the survey device 102 can record an identifier for the AP 304 (e.g., such as a MAC address) and also take measurements of a characteristic of the signal (e.g., such as an RSSI measurement). The data can be stored in a database (e.g., 106 of FIG. 1), the surveyor can bring the survey device 102 to the next reference point 302, and the process can be repeated until data for each desired reference point 302 is obtained.

In some implementations, the surveyor may follow a predetermined path and obtain data for reference points 302 at a particular distance interval (e.g., every three meters, every ten meters, etc.). For example, the surveyor may obtain data for a first reference point 302 when the surveyor first enters the mall. The surveyor may then begin walking down a hallway and obtain data for a second reference point 302 after walking approximately three meters. Data for reference points 302 can continue to be obtained in this fashion as the surveyor walks along various paths within Building A, including traveling to different floors within the building. In some implementations, the surveyor may gather data for a number of reference points 302 such that sufficient coverage of the venue is obtained. In general, the more reference points 302 for which data is obtained within a venue, the more accurate the subsequent positioning phase (e.g., 120 of FIG. 1) can be.

In some implementations, surveying may not be available for portions of the mall. For example, particular stores (e.g., Stores A-D) may not allow surveyors to survey within the stores. This is shown in FIG. 3 by the absence of any reference points 302 within the stores. Because no reference points exist within the stores, the mobile device 112 that performs the positioning phase 120 while the mobile device 112 is inside one of the stores may be unable to accurately determine its position. For example, because no reference points exist within the stores, the RSSI measurements 116 may not closely match any of the survey data obtained during the data training phase 110, or the RSSI measurements 116 may provide a poor match that results in the positioning phase 120 determining a location for the mobile device 112 that does not match its true location. For example, the mobile device 112 may be inside Store A at the upper wall, but the positioning phase 120 may determine that the mobile device 112 is at the reference point 304 near the entrance of Store A. Therefore, to improve the ability of the positioning phase 120 to determine positions of mobile devices 112 located at unsurveyed areas, additional reference points can be added to such unsurveyed areas. Adding such additional reference points is sometimes referred to as extending the radio map 300 (e.g., extending one or more borders of the radio map 300 to form an extended radio map).

In the illustrated example, the radio map 300 may be extended to cover areas for which survey data was not obtained. For example, the radio map 300 is extended by including a new reference point (e.g., a reference point that was not included in the initial version of the radio map 300. Such new reference points are referred to herein as extended reference points. In the illustrated example, the radio map 300 is extended into Store A by including an extended reference point $P_1$ 310, identified as a black circle. The extended reference point $P_1$ 310 is different than the reference points 302 identified by black triangles in that the extended reference point $P_1$ 310 was not obtained by the data training phase 110 of the surveying technique 100. Rather, extended reference point $P_1$ 310 is obtained by taking different location information (e.g., other than dropping a pin on a map, as described in more detail below). However, once the extended reference point $P_1$ 310 is obtained and added to the radio map 300, thereby extending the radio map 300, the extended reference point $P_1$ 310 may be treated by the radio map 300 and the positioning phase 120 the same way that the surveyed reference points 302 are treated. In other words, from the perspective of the radio map 300 and the positioning phase 120, the extended reference point $P_1$ 310 is simply another location that can be used to identify the current location of the mobile device 112 during the positioning phase 120.

The extended reference point $P_1$ 310 is obtained based on harvest data 306 (e.g., harvest traces). The harvest data 306 are represented as black x's in the illustration. Each element of harvest data 306 can be a sample point including, among other things, one or more sensor measurements obtained by a device (e.g., a mobile device). The harvest data 306 shown in FIG. 3 make up a trace (e.g., a harvest trace). That is, a trace is a collection of sample points of harvest data 306. The trace may be obtained as the device travels along a particular path. Using the harvest data 306 for a particular trace, in some cases by employing a regression technique such as a least squares technique using a Kalman filter (e.g., a forward-backward Kalman filter), a trajectory 308 is determined. In some implementations, the trajectory 308 is optimized to improve its accuracy, as described in more detail below. The trajectory 308 is a determination of a motion path traveled by the device. Based on the trajectory 308, various locations of the device over time can be determined.

In some implementations, each element of harvest data 306 includes i) data used to identify a location of the device, and ii) RSSI measurements for one or more of the APs 304. The data used to identify the location of the device (e.g., sometimes generally referred to as sensor data, motion data, dead reckoning data, etc.) includes measurements obtained by sensors of the device (e.g., one or more gyroscopes, accelerometers, compasses, barometers, etc. The elements of harvest data 306 may be obtained at a frequency of approximately 1 Hz (e.g., one element of harvest data 306 per second), and may include a speed and a heading rate. In some implementations, one or both of the speed and the heading rate (or, e.g., the sensor measurements used to determine the speed and heading rate) may be downsampled (e.g., at a frequency of less than 1 Hz). Such downsampling may be performed to reduce the resolution of the data in order to protect the privacy of the user.

The speed may be determined based on measurements obtained by a pedometer, accelerometer, and/or gyroscope. For example, a step count may be obtained by the pedometer, and a stride length (e.g., a distance traveled per step) may be determined based on measurements obtained by the accelerometer and/or the gyroscope. Based on the step count and the stride length, a distance traveled by the device can be indirectly determined. Thus, using the step count and the stride length over an elapsed time, the speed of the device can be determined. The heading rate may be determined based on measurements obtained by a compass, the gyroscope, the accelerometer, a magnetometer, etc. In particular, the heading rate may be derived based on a change of attitude of the device as measured by one or more of the compass, the gyroscope, the accelerometer, the magnetometer, etc. The heading rate can be integrated by the device to determine a heading. Therefore, for each element of harvest data 306, a value for the speed and a value for the heading of the device is determined.

Each element of harvest data 306 also includes RSSI measurements for one or more of the APs 304. Therefore, once the trajectory 308 is determined based on the harvest data 306, one or more locations on or proximate to the trajectory 308 (e.g., such as extended reference point $P_1$ 310) are identified as described below, and such locations can be correlated to the RSSI measurements to create additional location fingerprint data in a similar fashion as described above with respect to the location fingerprint survey data. The RSSI measurements for each AP 304 at each extended reference point may be represented as RSSI probability distributions in a manner similar to that described above with respect to FIG. 2. Probability density functions may be obtained (e.g., in the form of Rayleigh distributions), and the probability density functions may be used for determining the location of the mobile device 112 in subsequent positioning phases 120 using a maximum likelihood test, as described above.

In some implementations, the harvest data 306 may be filtered before it is added to the existing location fingerprint survey data that is stored in the database 106. Thereafter, during the positioning phase 120, the location of the device when the device is positioned at or near unsurveyed areas (e.g., such as within Store A) may be determined. When we talk about extending the radio map 300, we mean that devices located in the extended area (e.g., within Store A) may be able to accurately determine their respective location due to the inclusion of the additional location data in the form of extended reference points.

Figure 4:
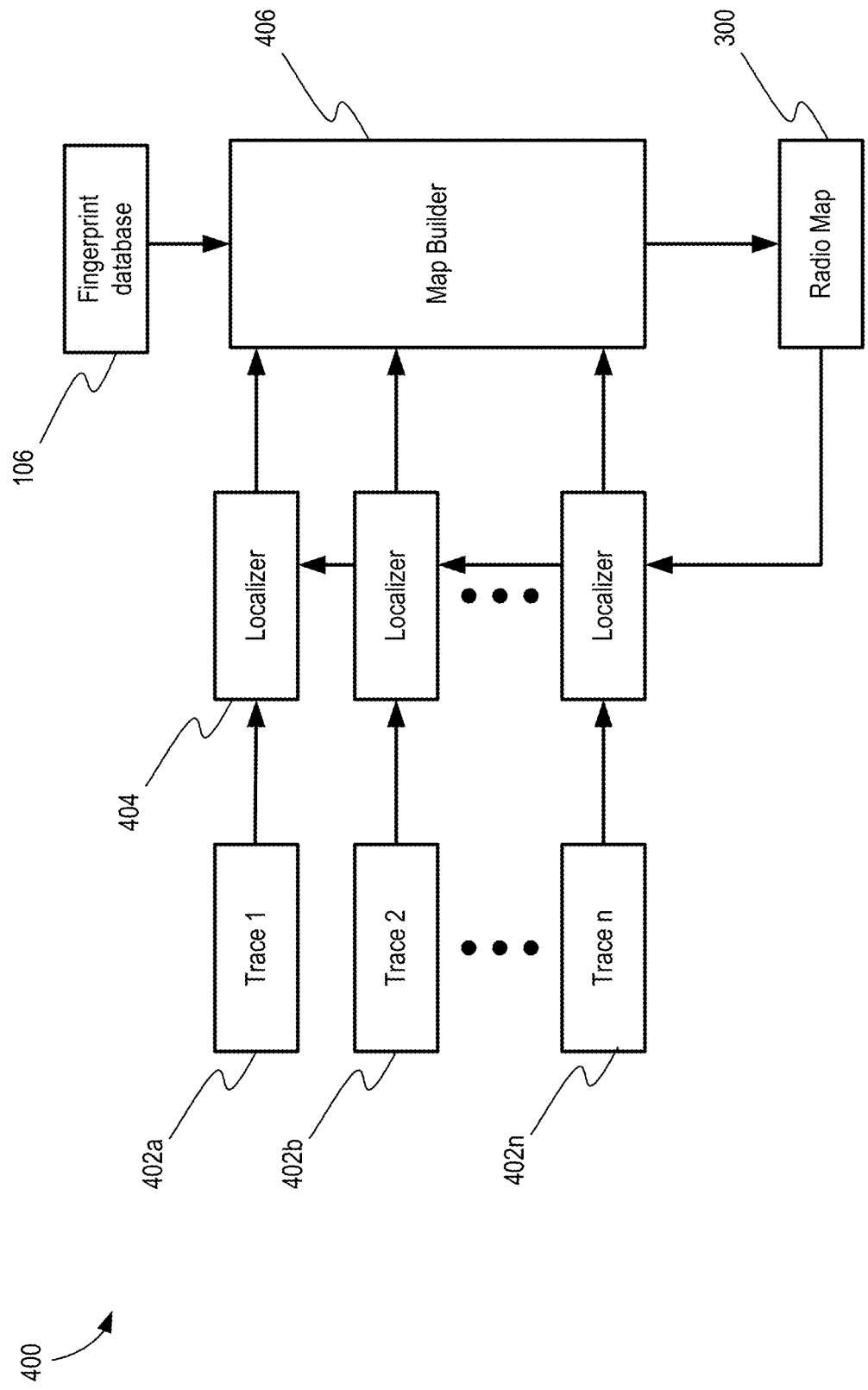
FIG. 4 is a block diagram illustrating an exemplary process of extending the radio map of FIG. 3 using harvest data.

FIG. 4 is a block diagram of an exemplary process 400 of extending the radio map 300 using harvest traces (e.g., based on the harvest data 306). A plurality of traces (e.g., Trace 1 402a, Trace 2 402b, Trace n 402n, etc.) are obtained from a plurality of devices. In some implementations, each trace may correspond to harvest data 306 obtained by a single device over a particular period of time. For example, referring again to FIG. 3, a single trace is illustrated which includes all of the illustrated harvest data 306. Additional traces may be obtained by the same device (e.g., at different times, at different locations, etc.) or by other devices contributing to the harvest data. Each trace is provided to a localizer 404 that is configured to determine an optimized trajectory based on the harvest data 306 for the particular trace. The optimized trajectories, which are also supplemented with the RSSI measurements for one or more of the APs 304, are provided to a map builder 406.

Before receiving the optimized trajectories and the corresponding RSSI measurements, the map builder 406 builds the radio map 300 using the survey data entries 108 included in the fingerprint database 106 in the manner described above. In some implementations, the radio map 300 may be received in another way, as described in more detail below. Once the optimized trajectories and the corresponding RSSI measurements are received by the map builder 406, the map builder 406 can refine the radio map 300 to include additional reference points (e.g., extended reference points, such as the extended reference point $P_1$ 310 of FIG. 3), thereby extending the radio map 300 into unsurveyed areas.

Referring again to FIG. 3, a single trajectory 308 is illustrated in Store A. In practice, the map builder 406 may consider a plurality of trajectories (e.g., tens, hundreds, thousands, etc.) inside Store A. The plurality of trajectories may be collectively considered to determine appropriate locations for including as extended reference points. For example, extending the radio map 300 may include identifying a plurality of trajectories (e.g., optimized trajectories) and identifying locations in the venue (e.g., particular cells of the radio map 300) that correspond to locations at or proximate to the plurality of trajectories. In some implementations, if a threshold number of traces pass through a particular cell of the venue, the location that corresponds to the particular cell can be added to the radio map 300 as an extended reference point.

In the illustrated example, the trajectory 308 corresponds to locations inside Store A. As such, the radio map 300 can be extended to include a footprint of Store A. The footprint of Store A may then be divided into a plurality of cells. For example, a grid may be applied to the locations at or proximate to the plurality of trajectories that includes a plurality of cells (e.g., including the cell 312). The cells may have the same or similar dimensions as the cells of the corridor. In some example, the cells have dimensions of between three meters by three meters and ten meters by ten meters, although other dimensions can be used. If at least one trajectory 308 passes through a cell of the radio map 300, the location that corresponds to the cell may be added as an extended reference point (e.g., the cell can be added to the radio map 300). In this way, multiple extended reference points can be added to the radio map 300 based on location information included in a single trajectory.

In some implementations, a location at or near a particular trajectory (or, e.g., a plurality of trajectories) may be determined to be appropriate for addition to the radio map 300 as an extended reference point based on one or more factors. In some implementations, an amount of harvest data 306 that is available for a particular location may factor into the determination of whether the particular location is to be included as an extended reference point. For example, a location may be included as an extended reference point if a particular number of elements of harvest data 306 (e.g., from one or more trajectories) that correspond to the cell of the radio map 300 are available. In some implementations, a location may be included as an extended reference point if a threshold number of trajectories that pass through the corresponding cell of the radio map 300 are available. In some implementations, one or more indicators of the quality of the harvest data 306 may be considered in determining whether the corresponding location are to be added to the radio map 300. For example, if much harvest data 306 for a particular location is available, but the quality of the harvest data 306 is below a quality threshold, the location may not be added as an extended reference point. In contrast, if harvest data 306 is determined to be of high quality (e.g., meeting a quality threshold), the corresponding location may be added as an extended reference point even if a relatively small quantity of harvest data 306 is available for the particular location. In some implementations, the quality of the harvest data 306 may be determined based at least in part on a horizontal accuracy of the elements of harvest data 306. In some implementations, the quality of the harvest data 306 may be determined at least in part based on the calculations performed by the localizer (404 of FIG. 4) when providing an optimized trajectory, as described in more detail below.

In some implementations, any location that resides at or is proximate to a trajectory may be considered for including as extended reference points. In other words, any cell of the venue through which a trajectory passes may be added to the radio map 300. In this way, any location that resides on a trajectory may be an appropriate location for including as an extended reference point.

Applying the grid may have the effect of binning the harvest data 306. For example, five elements of harvest data 306 reside within the cell 312, so those five elements of harvest data 306 are determined to correspond to a particular location (e.g., a single location). In some examples, the particular location has coordinates that correspond to the center of the cell 312. As such, the particular location at the center of the cell 312 is identified as being the extended reference point $P_1$ 310. The RSSI measurements that correspond to the five elements of harvest data 306 are correlated with the extended reference point $P_1$ 310. The RSSI measurements may be used to form a probability density function that corresponds to the extended reference point $P_1$ 310. In some implementations, rather than the extended reference points being assigned to the center of the cell 312, an averaging technique and/or a clustering technique may be applied to the plurality of trajectories to identify suitable locations to be used as extended reference points.

Additional extended reference points may be created for the other cells that the trajectories pass through. In the illustrated example, extended reference points may be created for the other nine cells that the trajectory 308 passes through along the perimeter of Store A. However, the trajectory 308 provides insufficient data for identifying extended reference points in the inner two cells of Store A. Other trajectories (e.g., based on other traces such as Trace 1 402a, Trace 2 402b, Trace n 402n, etc.) may subsequently be used to identify additional extended reference points and further extend the radio map 300.

Even after the radio map 300 is generated by the map builder 406 using both the survey data of the fingerprint database 106 and the extended reference points (e.g., based on the optimized trajectories provided by the localizers 404), the radio map 300 can be constantly updated (e.g., extended) and/or optimized in an iterative manner. For example, the arrow emanating from the left side of the radio map 300 block and traveling back to the localizers 404 indicates that the radio map 300 may constantly consider new harvest data and computed optimized trajectories to extend into additional unsurveyed areas. In this way, the radio map 300 can be used in a simultaneous localization and mapping (SLAM) manner in which the radio map 300 can provide the location of a device while simultaneously constructing and/or updating the radio map 300.

In some implementations, the radio map 300 may be progressively extended by applying the same harvest data through a plurality of passes. In this way, a confidence in the corresponding extended reference points can be increased. Such an approach may be especially beneficial for extended reference points that are located relatively deeper in unsurveyed areas, which may have a tendency to include increased compounded errors as compared to extended reference points that are located in relatively more shallow locations in unsurveyed areas. In some implementations, such a progressive extension approach may require a relatively large amount of uncorrelated traces over the same extended map areas (e.g., to prevent the iteration from leading to biases). In some implementations, one or more techniques may be employed on the traces during the map-building process, such as a leave-one-out cross-validation technique, to minimize possible biases.

While the localizers 404 as shown as having the same reference number (e.g., indicating that they are the same component), in some implementations, the localizer used from one trace (e.g. Trace 1 402a) to another (e.g., Trace 2 402b) may be different.

Figure 5:
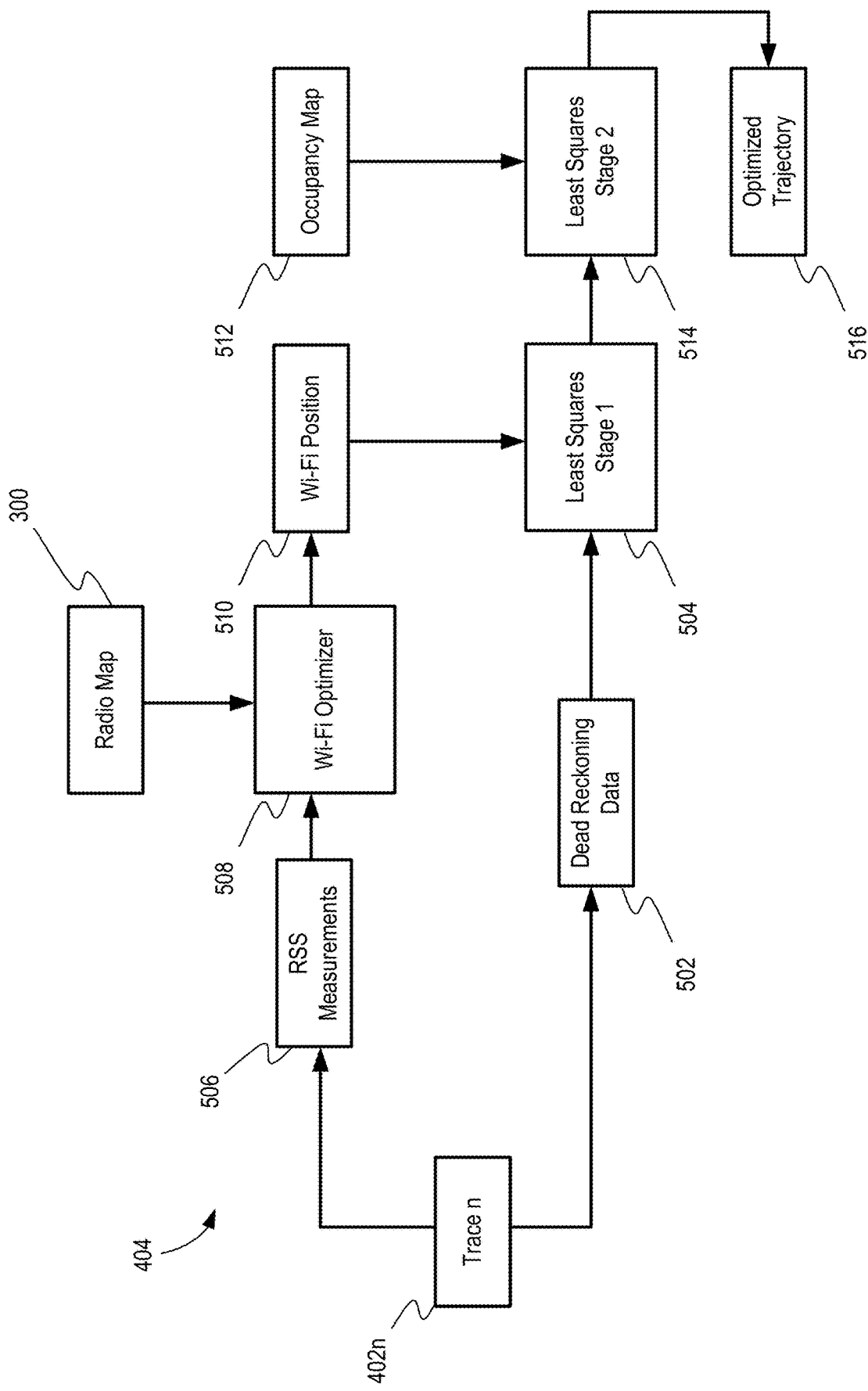
FIG. 5 is a block diagram of an exemplary localizer for determining an optimized trajectory based on the harvest data illustrated in FIG. 4.

FIG. 5 is a block diagram of an exemplary localizer (e.g., the localizer 404 of FIG. 4) that accepts a trace (e.g., Trace n 402n) as input and provides an optimized trajectory 516, which can then be provided to the map builder 406 to extend the radio map Referring to FIGS. 3 and 5 together, the trace 402n may be made up from the elements of harvest data 306 within and in proximity to Store A. For example, a user (e.g., a user contributing to the harvest data 306) carrying a device may enter Store A from a mall corridor. The user enters Store A from a location in the mall for which survey data was obtained. For example, a reference point 302 exists at the doorway into Store A. Therefore, as the user enters Store A and upon exiting Store A, the location of the user can be determined to a relatively high degree of accuracy. Once the user enters Store A, there may not be survey data available, and there may not be any additional (e.g., extended) reference points available. However, upon entering and traveling throughout Store A, the harvest data 306 are being collected by the user's device, and in some cases, being provided to a server (e.g., a "cloud" server).

At a given frequency (e.g., a frequency of about 1 Hz), elements of harvest data 306 are collected by the user's device. Each element of harvest data 306 includes data that can be used to identify a location of the device. Such data is referred to as dead reckoning data 502. Each element of dead reckoning data 502 includes a speed and a heading rate. The speed may be determined based on measurements obtained by a pedometer, accelerometer, and/or gyroscope of the device. For example, a step count may be obtained by the pedometer, and a stride length may be determined based on measurements obtained by the accelerometer and/or the gyroscope. Based on the step count, the stride length, and an elapsed time, the speed of the device can be determined. The heading rate may be determined based on measurements obtained by a compass, the gyroscope, the accelerometer, a magnetometer, etc. The heading rate can be integrated by the device to determine a heading. Therefore, for each element of dead reckoning data, a value for the speed and a value for the heading of the device is determined.

While survey data is typically accurate and reliable because the location that corresponds to each reference point was manually input by a human user, the dead reckoning data 502 may include inherent inaccuracies. For example, while the speed and heading rate may be known at one-second intervals, and while theoretically the location of the device may be determined based on such information, such errors tend to accumulate as the user travels throughout the store. For example, the user may be traveling in a straight line, but the dead reckoning data 502 may indicate that the user is "drifting" (e.g., departing from a straight line path). Such errors may compound until the location of the user can be known with a relatively high degree of certainly. For example, when the user exits Store A and is again in proximity to surveyed reference points 302, the location of the user is known, and such reliable information can be considered when computing the user's trajectory. Such locations that are determined with a high degree of certainty are sometimes referred to as anchors. Using anchors, a computed trajectory that is drifting can be corrected with more-reliable location information.

Using the user's speed and heading rate as inputs, a four-dimensional dynamics model can be used to determine the user's change in position as follows:

$$\begin{bmatrix} \hat{x} \\ \hat{y} \\ \hat{q}_1 \\ \hat{q}_2 \end{bmatrix} = \begin{bmatrix} 0 & 0 & v & 0 \\ 0 & 0 & 0 & v \\ 0 & 0 & 0 & -\omega \\ 0 & 0 & \omega & 0 \end{bmatrix} \begin{bmatrix} x \\ y \\ q_1 \\ q_2 \end{bmatrix} = \begin{bmatrix} q_1 & 0 \\ q_2 & 0 \\ 0 & -q_2 \\ 0 & q_1 \end{bmatrix} \begin{bmatrix} v \\ \omega \end{bmatrix}$$

where (x, y) is the user's position, v is the user's speed, $q_1=\cos\theta$, $q_2=\sin\theta$, $\theta$ is the user's heading, and $\omega$ is the user's heading rate.

A trajectory for the trace 402n can be determined based on the various computed changes in position using a least squares optimization (e.g., least squares stage 1 504) according to the following function:

$$J(\ldots, \hat{v}_k, \ldots, \hat{\omega}_k, \ldots) \stackrel{x_0, y_0, \theta_0}{=}$$
$$\sum_{k=1}^{N_d} \left[\sigma_v^{-2}(\overline{v}_k - \hat{v}_k)^2 + \sigma_\omega^{-2}(\overline{\omega}_k - \hat{\omega}_k)^2\right] + \sigma_p^{-2} \sum_{k=1}^{N_p} \left[(\overline{x}_k - \hat{x}_k)^2 + (\overline{y}_k - \hat{y}_k)^2\right]$$

where $\overline{v}_k$ and $\overline{\omega}_k$ are the measured dead reckoning data 502 as inputs, $\hat{v}_k$ and $\hat{\omega}_k$ are the estimated dead reckoning data, $\overline{x}_k$ and $\overline{y}_k$ are the measured user/device position, and $\hat{x}_k$ and $\hat{y}_k$ are the estimated user/device position (e.g., derived from the estimated dead reckoning data). Based on the least squares optimization function, an estimated trajectory is formed. The estimated trajectory is optimized according to one or more processes, as described in detail below, and the eventual result is an optimized trajectory 516.

Given an initial state (e.g., given by $x_0$, $y_0$, $\theta_0$) in the least squares optimization function, the dynamics model can be used to propagate the initial state combined with the input (e.g., $\hat{v}_k$ and $\hat{\omega}_k$) to obtain the position of the user/device at any point in time. The least squares optimization function weighs the position and the input at each time k by taking a difference between the measured positions (e.g., $\overline{x}_k$ and $\overline{y}_k$) and the estimated positions (e.g., $\hat{x}_k$ and $\hat{y}_k$) and a difference between the measured dead reckoning data (e.g., $\overline{v}_k$ and $\overline{y}_k$) and the estimated dead reckoning data (e.g., $\hat{v}_k$ and $\hat{\omega}$). Relatively small differences between the measured data and the estimated data indicate accurate predictions. The time k corresponds to the interval at which each element of harvest data 306 is obtained (e.g., once per second). In some implementations, the least squares optimization function may include additional terms. In some implementations, additional terms may be provided at a separate least squares stage (e.g., the least squares stage 2 514).

The Trace n 402n also includes RSSI measurements 506 for at least some of the elements of harvest data 306. For example, for a given element of harvest data 306, which corresponds to an estimated location on a trajectory determined according to the least squares optimization function above, RSSI measurements 506 obtained by the device when the device was at the estimated location on the trajectory are also known. The RSSI measurements 506 and the radio map 300 are provided to a Wi-Fi optimizer 508. The functionality of the Wi-Fi optimizer 508 may depend on the current state of the radio map 300. For example, if the radio map 300 currently only includes surveyed reference points 302, then the RSSI measurements 506 may only be useful if they are obtained from locations at or proximate to such surveyed reference points 302 (e.g., locations near the entrance of Store A). For example, suppose the least squares optimization function employed at the least squares stage 1 504 indicates that the user traveled into Store A, walked around inside Store A, and walked through the right wall of Store A into Store B. Upon the user in fact exiting Store A, the Wi-Fi optimizer 508 can determine a Wi-Fi position 510 of the user based on the RSSI measurements 506 and the existing radio map 300 including the surveyed reference points 302. Because survey data is relatively reliable, the reference point 302 located near the entrance of Store A is identified as being the location of the device despite the least squares optimization function identifying the location as being somewhere in Store B. In this implementation, the reference point 302 located near the entrance of Store A acts as an anchor. In this way, the Wi-Fi position 510 determined by the Wi-Fi optimizer 508 can provide input into the least squares stage 1 504 to provide a better estimate for the user's trajectory.

Now suppose the radio map 300 includes extended reference points (e.g., the extended reference point $P_1$ 310) that were obtained previously by the technique generally described herein. Such an extended reference point $P_1$ 310 may not be quite as reliable as surveyed reference points 302, but may still be relatively accurate, especially after some refinement by the positioning system. Such an extended reference point $P_1$ 310 may also be used as an anchor point for the dead reckoning data 502. In other words, if the dead reckoning data 502 causes the least squares optimization function to provide a given trajectory that includes drift errors, the Wi-Fi optimizer 508 can use the RSSI measurements 506 taken by the device, and the radio map 300 that includes the extended reference point $P_1$ 310, to determine a Wi-Fi position 510 that can be considered by the least squares stage 1 to assist in correcting the drift error. When the RSSI measurements 506 of Trace n 402n indicate that a close match has been obtained for the probability density function that corresponds to the extended reference point $P_1$ 310, the trajectory can be anchored to the location of the extended reference point $P_1$ 310 at the corresponding time, and the dead reckoning data 502 can be essentially reset such that any drift experienced up to that point is no longer causing a cumulative effect in the drift error. While drift error may still exist in the dead reckoning data 502 as the user travels in a clockwise direction around and out of Store A, such drift error will be minimal compared to the amount of drift error that would exist if no anchoring occurred inside Store A. As additional extended reference points are added to the radio map 300, and as existing extended reference points become refined by the employed SLAM technique, the location determination capability of the system inside unsurveyed areas is continuously expanded and improved.

In some implementations, the localizer 404 may also include a least squares stage 2 that considers input from an occupancy map 512. The occupancy map 512 is a representation of data that may be available and/or incorporated in a radio map 300. The occupancy map 512 indicates locations within the venue that cannot be occupied by users. For example, the occupancy map 512 may indicate that particular cells of the radio map 300 cannot be occupied because it is impossible for a user to occupy them (e.g., the location is inside a wall) or because such locations are restricted (e.g., private rooms inaccessible to the general public). Thus, if a position of a user is identified as being at a location that cannot be occupied, a decision can be made that the determined location is incorrect.

In some implementations, the occupancy map 512 and related information is provided to the least squares stage 2 514. In some implementations, the least squares stage 2 514 may simply be included in the form of an additional term to the least squares stage 1 504. If the estimated position (e.g., $\hat{x}_k$ and $\hat{y}_k$) is identified as a location that can be occupied (e.g., a walkable location) according to the occupancy map 512, then zero cost may be contributed to the least-squares optimization at the least squares stage 2 514. If the estimated position is identified as a location that cannot be occupied (e.g., non-walkable), then a quadratic cost (e.g., an error component that increases exponentially based on a quantity, in this case a distance) may be contributed to the least-squares optimization at the least squares stage 2 514. The quadratic cost may be relatively greater the further away the estimated position is from a walkable location. In other words, if the estimated position is determined to be at a location that is non-walkable, it can be de-weighted according to a distance between the estimated position and the closest walkable location provided by the occupancy map 512.

Following the least squares stage 2, the optimized trajectory 516 is provided to the map builder 406. The trajectory 516 is optimized in the sense that dead reckoning data 502 is initially used to obtain a general trajectory, but due to known inherent errors in the dead reckoning data 502, other techniques are applied to the general trajectory to minimize such errors and obtain an optimized trajectory 516 that is a more accurate representation of the actual path traveled by the user.

In some implementations, the localizer 404 may include one or more additional algorithms to assist in providing the optimized trajectory 516. For example, in some implementations, the localizer 404 may include a dead reckoning particle filter.

The localizer 404 can operate on the server or on the user's device to determine the optimized trajectory 516 and determine an estimated location of the user's device. In this way, the user can utilize the dead reckoning data 502 as well as the radio map 300 and the Wi-Fi optimizer 508 to determine a current location. The optimized trajectory 516 can also be provided to the map builder 406 to extend the radio map, as described above with respect to FIG. 4. For example, a similar process can be performed for other traces made up of other harvest data 306 (e.g., for a plurality of users, using a plurality of devices, at various times, traveling at various locations within the mall, etc.) to obtain a plurality of optimized trajectories. The map builder 406 can consider the plurality of optimized trajectories, identify particular locations in the optimized trajectories as extended reference points, and correlate such extended reference points with RSSI measurements to continuously extend the radio map 300 to cover additional unsurveyed locations. Therefore, users who subsequently use the indoor positioning system will have additional reference points available to them to improve the location determination decision.

The representation of the localizer 404 illustrated in FIG. 5 includes elements that may or may not actually be part of the localizer 404, such as the input Trace n 402$n$ including the dead reckoning data 502 and the RSSI measurements 506, the input radio map 300, and/or the output optimized trajectory 516. Such elements are displayed as part of the localizer 404 block diagram for ease of viewing.

Figure 6:
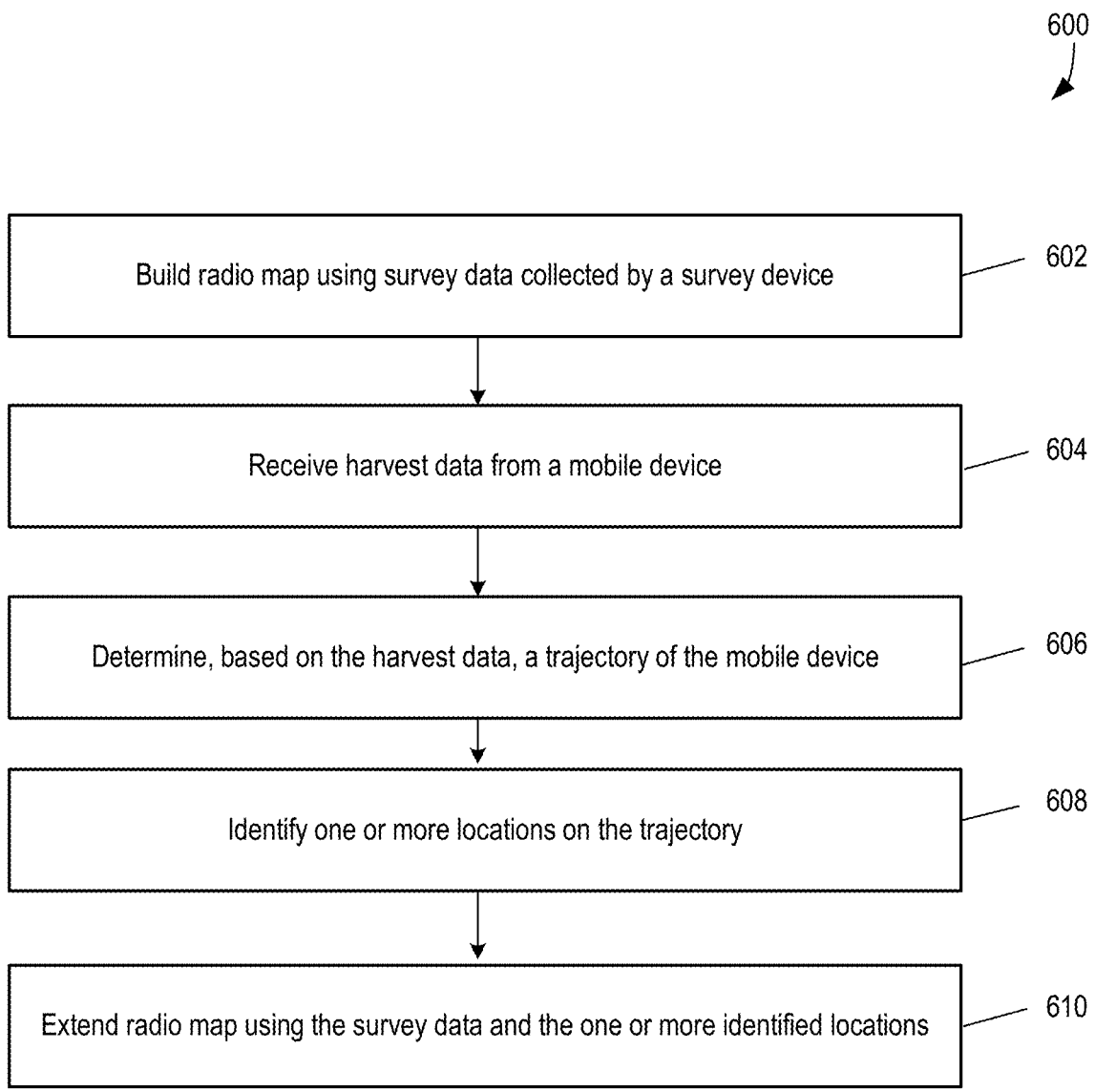
FIG. 6 is a flowchart of an exemplary process of extending a radio map.

FIG. 6 is a flowchart of an exemplary process 600 of extending a radio map (e.g., the radio map 300 of FIG. 3). The process 600 can be performed, for example, by the electronic device (e.g., a server) described with respect to FIG. 7, or the computing device (e.g., a mobile computing device) described with respect to FIG. 8. At step 602, a radio map (e.g., an indoor radio map) is built using the survey data. The radio map includes at least one boundary. Referring to the radio map 300 of the mall as an example, the initial radio map 300 includes a boundary at the bottom walls of Store A and Store B and a boundary at the top wall of Store C and Store D. In other words, because the initial radio map 300 is built using survey data, and thus includes surveyed reference points 302 in the corridor of the mall but no extended reference points (e.g., the extended reference point $P_1$ 312), the initial radio map 300 is bound at least by the walls between the corridor and Stores A-D.

At step 604, harvest data (e.g., the harvest data 306 of FIG. 3) is received from a mobile device. As described above, the harvest data 306 may be harvest traces, where the collection of harvest data 306 make up a harvest trace. Each element of harvest data 306 can be a sample point including, among other things, one or more sensor measurements obtained by the mobile device (e.g., used to identify a location of the mobile device) and RSSI measurements for one or more of the APs 304 in or proximate to the mall. The harvest data 306 may be obtained by the mobile device while a user carries the mobile device across various location inside and outside the boundary of the radio map 300. For example, a user may carry a mobile device in his pocket as he walks along the corridor of the mall. As the user walks, the harvest data 306 may be obtained at a rate of approximately 1 Hz. Harvest data 306 may be obtained while the mobile device is positioned inside the boundary of the initial radio map 300 (e.g., outside of the entrance to Store A) as well as while the mobile device travels outside the boundary of the initial radio map 300 (e.g., inside of Store A).

At step 606, based on the harvest data 306, a trajectory (e.g., the trajectory 308) of the mobile device is determined. In particular, the one or more sensor measurements obtained by the mobile device are used to determine (e.g., continuously or substantially continuously) a location of the mobile device as the mobile device travels within Store A. For example, because no surveyed reference points 302 exist within Store A, the positioning phase 120 cannot be reliably used to determine the location of the mobile device while the mobile device is within Store A. The one or more sensor measurements include measurements obtained by a pedometer, accelerometer, gyroscope, compass, magnetometer, etc. of the mobile device. The one or more measurements are used to determine a speed and a heading rate of the mobile device as the mobile device travels within Store A. Using the technique described above with respect to FIGS. 4 and 5, the trajectory 308 of the mobile device is determined based on the computed speed and heading rate. At least some of the trajectory 308 resides outside of the initial boundary of the radio map 300. In other words, a substantial portion of the trajectory 308 resides inside of Store A (e.g., because the trajectory 308 is used to identify locations for which survey data does not exist).

At step 608, one or more locations on or proximate to the trajectory are identified. In the illustrated example, one of the identified locations is the extended reference point $P_1$ 310. The extended reference point $P_1$ resides both at the center of the cell 312 and directly on the trajectory 308. However, in some examples, the trajectory 308 may not pass through the center of the cell, yet the center of the cell may be set as the identified location. For example, referring to the cell 314, the trajectory 308 does not pass through the center of the cell 314, yet due to the binning technique employed, the center of the cell 314 may be set as the identified location, and the harvest data 306 that resides within the cell 314 may be determined to correspond to the identified location at the center of the cell 314.

The extended reference point $P_1$ 310 can be used as an additional reference point to be used during a subsequent positioning phase 120 in a manner similar to the reference points 302 obtained by the survey device 102. For example, in addition to including sensor measurements (e.g., dead reckoning data) for determining a position of the mobile device, each element of harvest data 306 also includes RSSI measurements for one or more of the APs 304 in or proximate to the mall with which the mobile device is in communication. Thus, the position of the extended reference point $P_1$ 310, which resides in the cell 312, can be correlated with a set of RSSI measurements that correspond to, for example, the five elements of harvest data 306 that reside in the cell 312. In practice, many additional elements of harvest data 306 may exist in the cell 312 (e.g., from other harvest traces from other mobile devices, from other harvest traces from the same mobile device, etc.). The RSSI measurements that correspond to the harvest data 306 within the cell 312 can be represented as RSSI probability distributions for each of the APs 304 in a manner similar to that described above with respect to FIG. 2. Probability density functions may be obtained (e.g., in the form of Rayleigh distributions), and the probability density functions may be used for determining the location of the mobile device 112 in subsequent positioning phases 120 using a maximum likelihood test, as described above. In other words, once the extended reference point $P_1$ 310 is correlated with probability density functions for each of the AP 304, mobile devices 112 that are positioned inside Store A at or near the extended reference point $P_1$ 310 will be able to determine their positions to be at the cell 312 upon receiving RSSI measurements 114 that satisfy the maximum likelihood test.

At step 610, an extended radio map is built using both the survey data and the one or more identified locations. For example, once the one or more identified locations are correlated with RSSI measurements (e.g., in the form of probability density functions), the one or more identified locations and the corresponding RSSI measurements can be used (e.g., by the map builder 406 of FIG. 4) to extend the radio map (e.g., build an updated version of the radio map 300). The extended radio map is defined at least in part by an extension of the boundary. The extended boundary encompasses the one or more identified locations on or proximate to the trajectory. In the illustrated example of FIG. 3, the boundary of the radio map 300 that is formed between the corridor and Store A is extended to encompass the perimeter of Store A. The extension of the boundary is possible due to the inclusion of location and RSSI information that corresponds to the extended reference point $P_1$ 310. Therefore, the extended radio map now includes the cell 312 and the extended reference point $P_1$ included therein. In some implementations, the identified one or more locations and the corresponding RSSI measurements are stored in the fingerprint database 106 in a similar form as the survey data entries 108. In this way, during a subsequent positioning phase 120, the extended reference points may be indistinguishable from the surveyed reference points 302.

In some cases, harvest data may be unsuitable for supplementing the survey data for a number of reasons. If unsuitable harvest data is used by the map builder 406, the net effect may be to reduce the overall accuracy of the location determination system. Therefore, in some implementations, the harvest data (and, e.g., the resulting optimized trajectories) may be examined and filtered prior to being used to extend the radio map to ensure that the data will allow for extension of the radio map without negatively impacting the accuracy of the system. If the system determines that the optimized trajectories are unreliable (e.g., there is relatively little confidence that the locations on the optimized trajectories match the true location of the device), such optimized trajectories may not be considered for adding additional extended reference points to the radio map.

In some implementations, the harvest data 306 may include one or more indicators of the accuracy of the data. For example, the harvest data may include a parameter for indicating that the measurements obtained by one or more of the pedometer, the gyroscope, the accelerometer, the magnetometer, etc. are particularly noisy or particularly inaccurate for a variety of reasons. Such inaccuracies may result in an inaccurate calculation of the user's speed and heading rate, and in turn, an inaccurate computed optimized trajectory. Thus, if the parameter satisfies a predetermined threshold, the optimized trajectory computed based on the harvest data 306 may be ignored by the map builder 406, or the optimized trajectory may be assigned a relatively lesser weight than other optimized trajectories that do not include such indicators of low accuracy.

While we have largely described the additional location data for extending the radio map as being harvest data that makes up harvest traces, other types of location data can also or alternatively be used to extend the radio map. For example, in some implementations, the additional location data may be harvested GPS data that identifies a GPS location. For example, when a user is at a location for which GPS data is available, the user's device may determine the GPS location of the device as well as RSSI measurements of various APs that the device is in communication with. Like the harvest data, the GPS data can also be filtered before being used to identify additional reference points for extending the radio map. Once the GPS data is determined to be reliable, the GPS location can be added as an extended reference point on the radio map. Thereafter, when a mobile device is in proximity to the extended reference point and obtains RSSI measurements similar to the RSSI measurements obtained by the device at the GPS location, the GPS location can be identified as the location of the mobile device.

While a "probabilistic approach" has largely been described as being used for comparing the location fingerprint stored in the database 106 to the RSSI measurements 114 (e.g., the comparing 116 of FIG. 1) to determine the location of the mobile device 112, other techniques may alternatively or additionally be used. In some implementations, a nearest neighbor test is used in which the RSSI measurements 114 are compared to the survey data (e.g., the RSSI measurements for each of the APs 104). The Euclidean distance between the RSSI measurements 114 and each reference point fingerprint is determined, and the reference point corresponding to the smallest Euclidean distance is determined to be the likely (x, y) location of the mobile device 112.

While the venue has largely been described as being a mall, other venues may be surveyed by the survey device to create a radio map to be extended. The venue may be an indoor venue (e.g., a restaurant, a shopping complex, a convention center, an indoor sports or concert stadium, a movie theater, a parking lot, etc.) or an outdoor venue (e.g., a street, an outdoor sports or concert stadium, an amusement park, a fair, a carnival, a park, a national park, a canyon, a valley, a collection of hiking trails, a parking garage, etc.). In some implementations, the venue may be aboveground or belowground (e.g., a belowground parking garage or a belowground shopping complex). In some implementations, the venue is a location that is not able to receive sufficiently accurate GPS signals. Therefore, the venue may be an outdoor location that includes obstructions to GPS signals (e.g., a crowded city block, a canyon, etc.).

While the RSSI measurements (e.g., for each AP at each reference point, for each AP at each extended reference point, etc.) are largely described as being fit to a Rayleigh distribution, other probability distributions having different probability density functions can also or alternatively be used. For example, in some implementations, one or more of a Uniform (e.g., Continuous) probability distribution, a Gaussian probability distribution, and a Ricean probability distribution may be used, among others. In some implementations, one or more aspects of any combination of the Rayleigh, Uniform, Gaussian, and Ricean probability density functions may be included in the probability density function that is used.

While the radio map (e.g., an initial version of the radio map) has been largely described as being obtained by taking RSSI measurements of Wi-Fi signals received from various APs, one or more other wireless protocols may be employed instead of or in addition to Wi-Fi. For example, in some implementations, the survey device may be configured to obtain RSSI measurements for Bluetooth signals received when the survey device is positioned at various reference points. The Bluetooth signals may be received from various Bluetooth transmitter located throughout and/or proximate to a venue. Such RSSI measurements of the Bluetooth signals may be used, either alone or in combination with the Wi-Fi data, to generate the location fingerprint of the venue.

While the survey data has largely been described as being obtained by a survey device that measures characteristics of Wi-Fi signals, other types of data may be used as "source data." In other words, survey data is one example of the type of source data that can be used to build the initial radio map. In general, the source data has a relatively high degree of accuracy and can be trusted as corresponding to the true location of the device. In the examples largely described above, the survey data has a relatively high degree of accuracy because the locations that correspond to each reference point are manually input by a human user. In some implementations, survey data may be "truth data" obtained from truth sources (e.g., sources that are known to provide location data having a relatively high degree of accuracy, such as user-input data). In this way, rather than the initial radio map being built based on survey data, the initial radio map may be built using other high quality data from other truth sources. In some implementations, the high quality data may be high quality GPS data (e.g., which may be determined based on the horizontal error associated with the GPS data).

While the radio map (e.g., an initial version of the radio map) has been largely described as being obtained by a survey device that measures a plurality of RSSIs from various APs at various reference points (e.g., provided as surveyor-entered positions), the radio map may be obtained (e.g., received) in other ways. In some implementations, the radio map may be built from source data other than survey data. In some implementations, the radio map may be previously obtained and subsequently extended according to the techniques described herein. For example, the radio map may be obtained from a database of radio maps that were previously built.

While the radio map has largely been described as being obtained for an indoor venue, a similar process can be applied to build a radio map for an outdoor location. For example, outdoor locations can sometimes rely on GPS data to accurately determine a position of a device. However, some outdoor locations may have characteristics that result in inaccurate position determination using GPS. For example, city streets may have surrounding buildings that impede/obscure line of site of GPS signals, thereby causing difficulty in determining position using GPS. In rural areas, natural barriers (e.g., canyons, valleys, etc.) may similarly impede GPS signals. In such locations, a surveying technique may be used to building a radio map. Or, for example, one or more other techniques may be used for building a radio map (e.g., using other truth data).

Similarly, in some implementations, indoor venues may not require a surveying technique to build a radio map. For example, an indoor location may have a glass roof or some other characteristic that allows GPS signals to sufficiently cover the venue. In such circumstances, GPS data may be identified as being of relatively high accuracy such that the GPS data can be accepted as truth data. In some implementations, such GPS data can be used to build the radio map. In general, outdoor locations may have characteristics similar to typical indoor locations, and indoor locations may have characteristics similar to typical outdoor locations, such that the technique described herein as largely applying to indoor locations can likewise be applied to outdoor locations, and vice versa.

While the radio map has largely been described as being extended by extending a boundary of the radio map, the radio map may be extended in other ways. In general, extending the radio map involves using information related to explored areas of the radio map to determine information about unexplored areas of the radio map. For example, the explored areas of the radio map may represent areas within the venue for which a location can be determined at a relatively high level of accuracy using survey data. Such locations can be used as anchor points. The anchor points, in combination with additional data (e.g., harvest trace data), can be used to extend the radio map into unexplored areas. In this way, the radio map can be extended into unexplored areas without necessarily extending a border of the radio map.

In some implementations, an initial radio map may not exist as a prerequisite for extending the radio map. In other words, while we have largely described an initial radio map being built using survey data and a boundary of the radio map being extended using harvest data, in some implementations, the initial radio map may be built and subsequently extended using harvest data. In some implementations, because such a radio map may not be built based on "truth" data (e.g., source data that is known to be accurate, such as survey data), such a radio map may include inaccuracies. However, such inaccuracies may be corrected by the iterative process described above with respect to FIG. 4.

In some implementations, the boundary is a soft boundary, such that a degree of blending occurs between reference points and corresponding data inside and outside the boundary. In some implementations, in-boundary data (e.g., reference points that were generated based on truth data and that reside within the initial radio map) may be less susceptible to modification than data that resides outside of the boundary (e.g., the extended reference points). In some implementations, in-boundary data may not be modified because it is taken as truth data. In other words, the system may keep intact in-boundary data because it was obtained under circumstances that ensure data of high accuracy.

In some implementations, the WLAN (e.g., Wi-Fi) infrastructure may follow an IEEE standard, such as an IEEE 802.11 protocol, although other protocols may also or alternatively be used.

This disclosure describes various Graphical User Interfaces (UIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers "to select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Example Feature-Based SLAM

Figure 7:
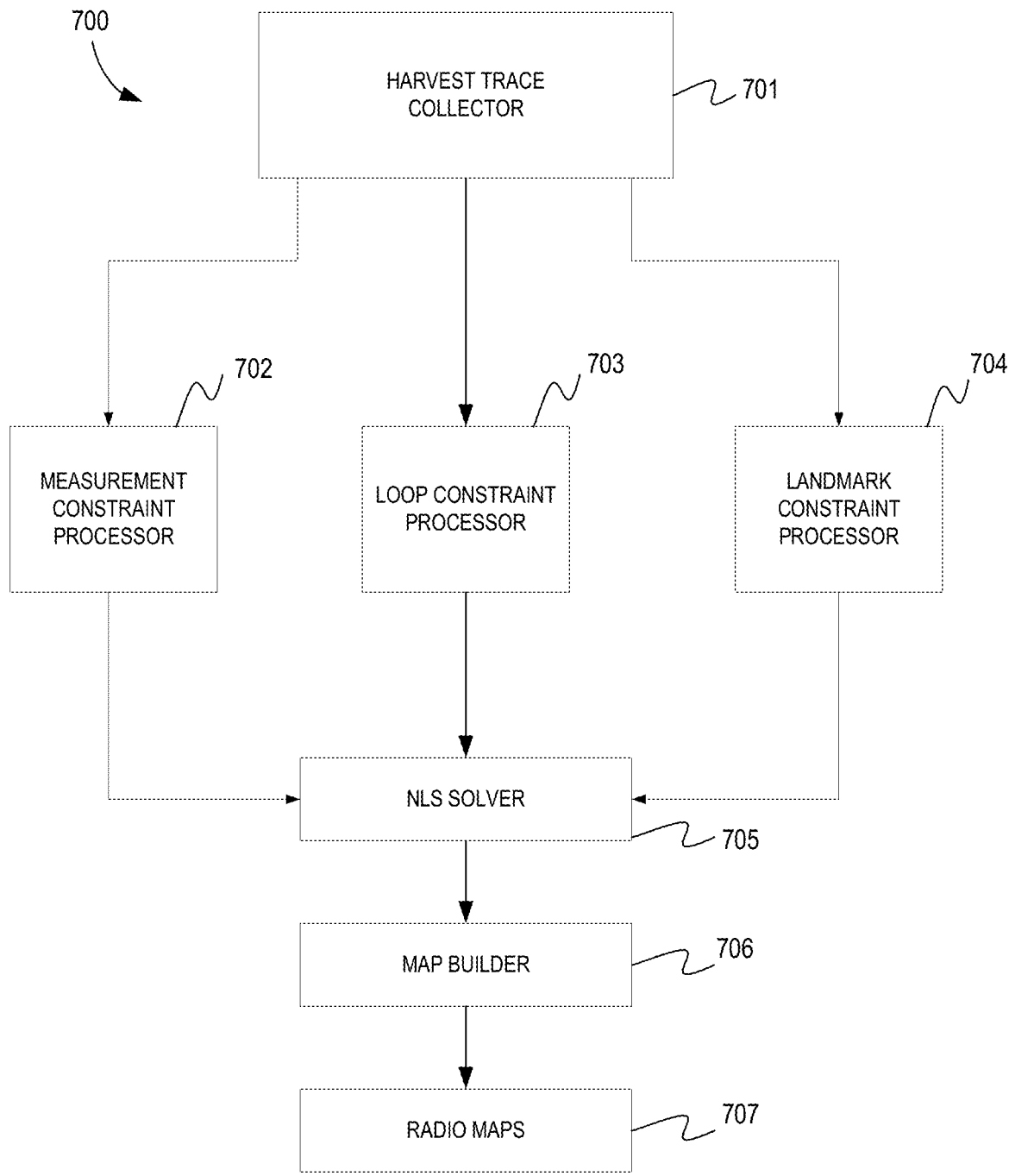
FIG. 7 is a block diagram of another exemplary system for extending a radio map using feature-based SLAM.

FIG. 7 is a block diagram of another exemplary system 700 for extending a radio map using feature-based SLAM. System 700 includes harvest trace collector 701, measurement constraint processor 702, loop constraint processor 703, landmark constraint processor 704, non-linear least squares (NLS) solver 705 and map builder 706. In an embodiment, system 700 detects features in the environment to extend radio map coverage into areas where survey data is unavailable I. Problem Statement In an embodiment, system 700 determines the best estimate of states $Z=[z_0, z_1, z_2 \ldots z_n]$ that maximizes the posterior probability of Z given measurements $U=[u_0, u_1 \ldots u_{n-1}]$, landmarks $L=[\{l_1, z_{i1}\}, \{l_2, z_{i2}\} \ldots \{l_m, z_{im}\}]$ and loop constraints $C=[c_0, c_1, \ldots c_l]$:

$$p(Z|U,L,C) \propto p(Z|U)p(L|Z)p(C|Z).$$

Z can be obtained by harvest trace collector 701 from a single trace or multiple traces. If all the states $z_i \in Z$ are from a single trace, then measurement constraint processor 702 calculates the posterior probability P(Z|U) as shown below using the log function to simplify the expression.

$$P(Z \mid U) \propto p(z_1 \mid z_0, u_0) p(z_2 \mid z_1, u_1) \ldots p(z_n \mid z_{n-1}, u_{n-1}) \propto$$

$$e^{\sum_{z_k \in Z} -\frac{1}{2}(z_k - f(z_{k-1}, u_{k-1}))^T W_{k-1}^{-1} (z_k - f(z_{k-1}, u_{k-1}))} \Rightarrow$$

$$\log P(Z \mid U) \propto \sum_{z_k \in Z} (z_k - f(z_{k-1}, u_{k-1}))^T W_{k-1}^{-1} (z_k - f(z_{k-1}, u_{k-1}))$$

If the states $z_i \in Z$ are from different traces, then measurement constraint processor 702 calculates the posterior probability P(Z|U) as shown below.

$$P(Z \mid U) \propto \prod_{Z_i \in Z} P(Z_i \mid U_i) \propto \prod_{Z_i \in Z} \prod_{z_k \in Z_i} p(z_k \mid z_{k-1}, u_{k-1}) \Rightarrow \log P(Z \mid U) \propto$$

$$\sum_{Z_i \in Z} \log P(Z_i \mid U_i) \propto \sum_{Z_i \in Z} \sum_{z_k \in Z_i} (z_k - f(z_{k-1}, u_{k-1}))^T W_{k-1}^{-1} (z_k - f(z_{k-1}, u_{k-1}))$$

Loop constraint processor 703 calculates the posterior probability P(C|Z) as shown below using the log function to simplify the expression.

$$P(C \mid Z) \propto \prod_{C_{ij} \in C} p(C_{ij} \mid z_i, z_j) \propto$$

$$e^{\sum_{C_{ij}} -\frac{1}{2}(z_j - z_i)^T R_{C_{ij}}^{-1} (z_j - z_i)} \Rightarrow \log(P(C \mid Z)) \propto \sum_{C_{ij}} (z_j - z_i)^T R_{C_{ij}}^{-1} (z_j - z_i)$$

Landmark constraint processor 704 calculates the posterior probability P(L|Z) as shown below using the log function to simplify the expression.

$$P(L \mid Z) \propto \prod_{(l,z) \in L} p(\{l, z\} \mid z) \propto$$

$$e^{\sum_{(l,z)} -\frac{1}{2}(z_j - L_k)^T R_{L_k}^{-1} (z_j - L_k)} \Rightarrow \log(P(L \mid Z)) \propto \sum_{(l,z) \in L} (z_j - L_k)^T R_{L_k}^{-1} (z_j - L_k)$$

The posterior probabilities described above can be summed together to get log p(Z|U, L, C). Log p(Z|U, L, C) is input into a NLS solver 705 (e.g., Gaussian-Newton, Levenberg-Marquardt) to find the best estimate of Z. The output of NLS solver 705 is a global best estimate of trace locations or the best estimate of Z. The WiFi signals observed are then referenced to those updated locations and used in radio map builder 706.

II. Landmark and Loop Constraints Detection

Typically in a two-dimensional (2D) x-y plane, landmark and loop constraints only indicate the proximity of x (latitude) and y (longitude), not θ (heading). Accordingly, the heading θ is ignored when computing the residual between states Z and landmark and loop constraints. In an embodiment, harvest trace collector 701 collects harvest traces and their corresponding timestamps. The harvest traces include trace data, such as pedometer data with speed and attitude information, pressure data which can indicate relative altitude change within a trace, WiFi scan data which is captured by a wireless transceiver along the trace and a location fix that includes latitude and longitude estimated from a location processor. The trace data can be used by the system to extract landmark and loop constraints to help solve a graph simultaneous localization and mapping (SLAM) problem.

A. Location Landmark Constraint

In an embodiment, a location fix (latitude, longitude, uncertainty) provided by a location processor (e.g., a GPS receiver, WiFi position estimator) is used as a landmark, and the uncertainty is used as a covariance matrix of the landmark.

B. WiFi Hotspot Loop Constraint

The WiFi scan data contains a timestamp, AP MAC address and an observed RSSI value. In an embodiment, the system can determine by the RSSI values when a trace encounters a very strong WiFi AP signal, such as a WiFi hotspot. If two states from two different traces (or from the same trace if not too close in time) observe the same strong WiFi AP signal, the system assumes the WiFi APs are physically close to each other, and a WiFi hotspot loop constraint is created. In an embodiment, if a particular WiFi AP with observed RSSI values greater than a particular RSSI threshold (e.g., −40 dBm), the particular WiFi AP is a strong WiFi AP, and a fixed covariance is used for the WiFi loop constraint. A WiFi hotspot is generally less noisy than other loop constraints, but it suffers from an availability issue. For example, a trace typically does not have a WiFi hotspot observation very often and many traces never observe a WiFi hotspot.

C. WiFi Scan Similarity Loop Constraint

In an embodiment, instead or in addition to using a WiFi hotspot loop constraint, a WiFi scan similarity loop constraint can be used to compare APs from two different WiFi scans to find similar WiFi scan pairs. The steps to detect WiFi scan pairs includes grouping the WiFi scan data into an N-second (e.g., N=5s) time window, and considering each group as a WiFi scan event. A WiFi scan distance between a WiFi scan pair can be computed by combining the WiFi scan Jaccard distance and Euclidean distance. Any WiFi scan pair whose distance is lower than a threshold distance T (e.g., T<4.5) generates a WiFi scan similarity loop constraint. A fixed covariance is used for the WiFi scan similarity constraints. WiFi scan similarity loop constraints are more noisy then other loop constraints, but there are typically many WiFi scans per trace. A larger fixed covariance can be used to compensate for the increased noise.

D. Floor Transition Loop Constraint

In a multi-level indoor environment, a single harvest trace may have floor transition events, which can be detected using barometer pressure data. In an embodiment, the system can determine when harvest traces overlap with each other during floor transitions by comparing the WiFi scan data that was captured during the floor transition and use the data to create a floor transition loop constraint. In an embodiment, the steps to create a floor transition loop constraint include: 1) detecting a floor transition period for each harvest trace using an offline floor transition detector, 2) computing a normalized WiFi scan distance for each WiFi AP pair using dynamic time warping and the WiFi scan distance function described above (e.g., by combining the WiFi scan Jaccard distance and Euclidean distance); and 3) determining for any floor transition the WiFi AP pair whose WiFi scan distance is lower than a distance threshold, and generating the floor transition loop constraint.

Similar to the other loop constraints, a fixed covariance is used for the floor transition constraint. The floor transition loop constraint is less noisy then the WiFi scan similarity loop constraint, but noisier then the WiFi hotspot loop constraint. The floor transition loop constraint also suffers from an availability issue as not every trace has a floor transition event. Floor transition events can be used for graph SLAM on the z-axis (i.e., altitude, floor ordinal). In an embodiment, the z-axis can be added to the 2D graph SLAM, a three-dimensional (3D) graph SLAM can be created, or a 1D graph SLAM can be used on the z-axis only.

III. State Transition Model Description and Inputs

Having described the problem setup and landmark/Loop constraint detections, a more detailed computation of the posterior probabilities will now be described.

1. State: A user location trace can be described by a set of k states $z_k=[x_k,y_k,\theta_k]^T$, where $x_k$ is latitude, $y_k$ is longitude and $\theta_k$ is heading.

2. Measurement: Between each consecutive states from a single trace, there is also a measurement $u_k=[\Delta d_k,\Delta\theta_k]^T$, where: $\Delta d_k$ is the distance between two consecutive states, $\Delta\theta_k$ is the heading change between two consecutive states and the state transition model is given by $z_k=f(z_{k-1},u_{k-1})+n_k$, where $n_k$ is the state transition model noise, and we assume the noise follows a zero mean Gaussian distribution with covariance $P_k$: $n_k \sim N(0, P_k)$. The equations of motion are as follows.

$$x_k = x_{k-1} + \Delta d_{k-1} \cos(\theta_{k-1}+\Delta\theta_{k-1})+n_k^x$$

$$y_k = y_{k-1} + \Delta d_{k-1} \sin(\theta_{k-1}+\Delta\theta_{k-1})+n_k^y$$

$$\theta_k = \theta_{k-1} + \Delta\theta_{k-1}+n_k^\theta$$

Besides the state transition model, the measurement also has noise. We assume the noise of $u_k$ follows a zero mean Gaussian distribution with covariance $Q_k$. Due to noise in the measurement and state transition model, there will be error between the predicted state $f(z_k-1, u_k-1)$ and the true state $z_k$. We assume this error also follows a zero mean multivariate Gaussian distribution with covariance $w_{k-1}$. The covariance $w_{k-1}$ is computed as follows.

$$w_{k-1} = A_{k-1} Q_{k-1} A_{k-1}^T + P_{k-1}, \text{ where } A_{k-1} \text{ is given by:}$$

$$\begin{bmatrix} \cos(\theta_{k-1}+\Delta\theta_{k-1}) & -\Delta d_{k-1}\sin(\theta_{k-1}+\Delta\theta_{k-1}) \\ \sin(\theta_{k-1}+\Delta\theta_{k-1}) & \Delta d_{k-1}\cos(\theta_{k-1}+\Delta\theta_{k-1}) \\ 0 & 1 \end{bmatrix}$$

The posterior probability of the state $z_k$ with measurement $u_{k-1}$ and a previous state $z_{k-1}$ can be computed as follows.

$$p(z_k \mid z_{k-1}, u_{k-1}) \propto e^{-\frac{1}{2}(z_k-f(z_{k-1},u_{k-1}))^T w_{k-1}^{-1}(z_k-f(z_{k-1},u_{k-1}))}$$

3. Landmarks: Landmarks can be observed in the environment with known location $L_k=[x_{L_k},y_{L_k}]^T$, such as, for example, a GPS location from harvest data. Let $\{L_k, z_j\}$ denote observing landmark $L_k$ at/near state $z_j$, then the residual is $z_j-L_k=n_k$. The landmark observation can have some noise $n_k$, which is assumed to follow a zero mean multivariate Gaussian distribution: $n_k \sim N(0, R_{L_k})$, where $R_{L_k}$ is the covariance matrix for measurement $L_k$. Then the posterior probability of the landmark $\{L_k, z_j\}$ given state $z_j$ is as follows.

$$p(\{L_k, z_j\} \mid z_j) \propto e^{-\frac{1}{2}(z_j-L_k)^T R_{L_k}^{-1}(z_j-L_k)}$$

4. Loop Constraints: Loop constraints $C_{ij}$ can also be observed in the environment that indicate two states $z_i$ and $z_j$ that are physically close to each other, i.e., $z_j-z_i=n_{ij}$. The loop constraints can have noise $n_{ij}$, and it is assumed the noise follows a zero mean multivariate Gaussian distribution: $n_{ij} \sim N(0, R_{C_{ij}})$, where $R_{C_{ij}}$ is the covariance matrix for loop constraint $C_{ij}$. Then the posterior probability of the loop constraint $C_{ij}$ given states $z_i$ and $z_j$ is as follows.

$$p(C_{ij} \mid z_i, z_j) \propto e^{-\frac{1}{2}(z_j-z_i)^T R_{C_{ij}}^{-1}(z_j-z_i)}$$

The landmark and loop constraints described above may not apply to all elements of the states (e.g., landmark and physically close loop constraints only apply to $x_k$ and $y_k$). In these cases, an open constraint on one of the states (e.g., $\theta$) could be expressed by a large covariance in the corresponding element in $R_{L_k}$, $R_{C_{ij}}$, or expressed with a transform matrix like H=[1 0 0; 0 1 0]. Then, $H^*z_j-L_k=n_k$ or $H^*(z_i-z_j)=n_{ij}$.

Figure 8:
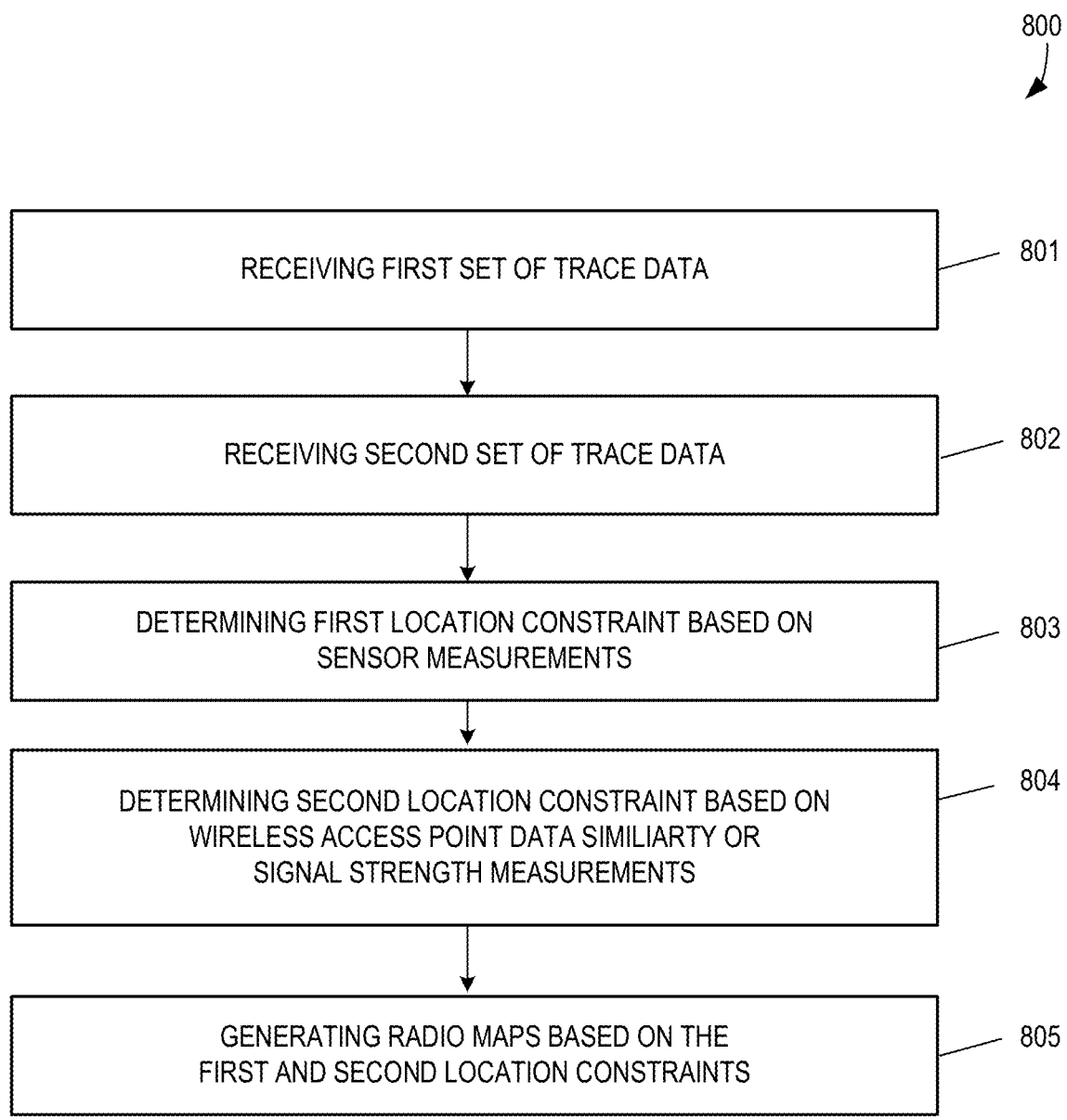
FIG. 8 is a flowchart of another exemplary process of extending a radio map using feature-based SLAM.

FIG. 8 is a flowchart of another exemplary process 800 of extending a radio map using feature-based SLAM. Process 800 can be implemented using the system architecture described in reference to FIG. 9.

Process 800 can begin by receiving, by one or more processors, first trace data from a first mobile device operating in an environment (801). The first set of trace data describes a first set of states of a first trajectory of the first mobile device (e.g., a smartphone) in the environment. The first set of trace data includes a first set of wireless access point data (e.g., WiFi scan data) and a first set of sensor measurements (e.g., acceleration data, angular rate data, pressure data) collected by the first mobile device while operating in the environment (e.g., an indoor environment, dense urban environment).

Process 800 continues by receiving, by the one or more processors, a second set of trace data from a second mobile device operating in the environment (802). The second set of trace data describes a second set of states of a second trajectory of the second mobile device in the environment. The second set of trace data includes a second set of wireless access point data and a second set of sensor measurements collected by the second mobile device while operating in the environment. In an embodiment, the first and second mobile device are the same mobile device, and the in other embodiments, the first and second mobile devices are different mobile devices.

Process 800 continues by determining, by the one or more processors, a first location constraint (e.g., a measurement constraint) based on at least one of the first or second set of sensor measurements (803) (e.g., delta distance or delta heading measurements).

Process 800 continues by determining, by the one or more processors, a second location constraint based on at least one of signal strength measurements (e.g., RSSI values) in the first or second sets of wireless access point data (e.g., WiFi scans) or a similarity between the first and second sets of wireless access point data (804).

Process 800 continues by generating, by the one or more processors, a radio map based on the first and second constraints (805), as described in reference to FIGS. 1-7.

Example System Architecture

Figure 9:
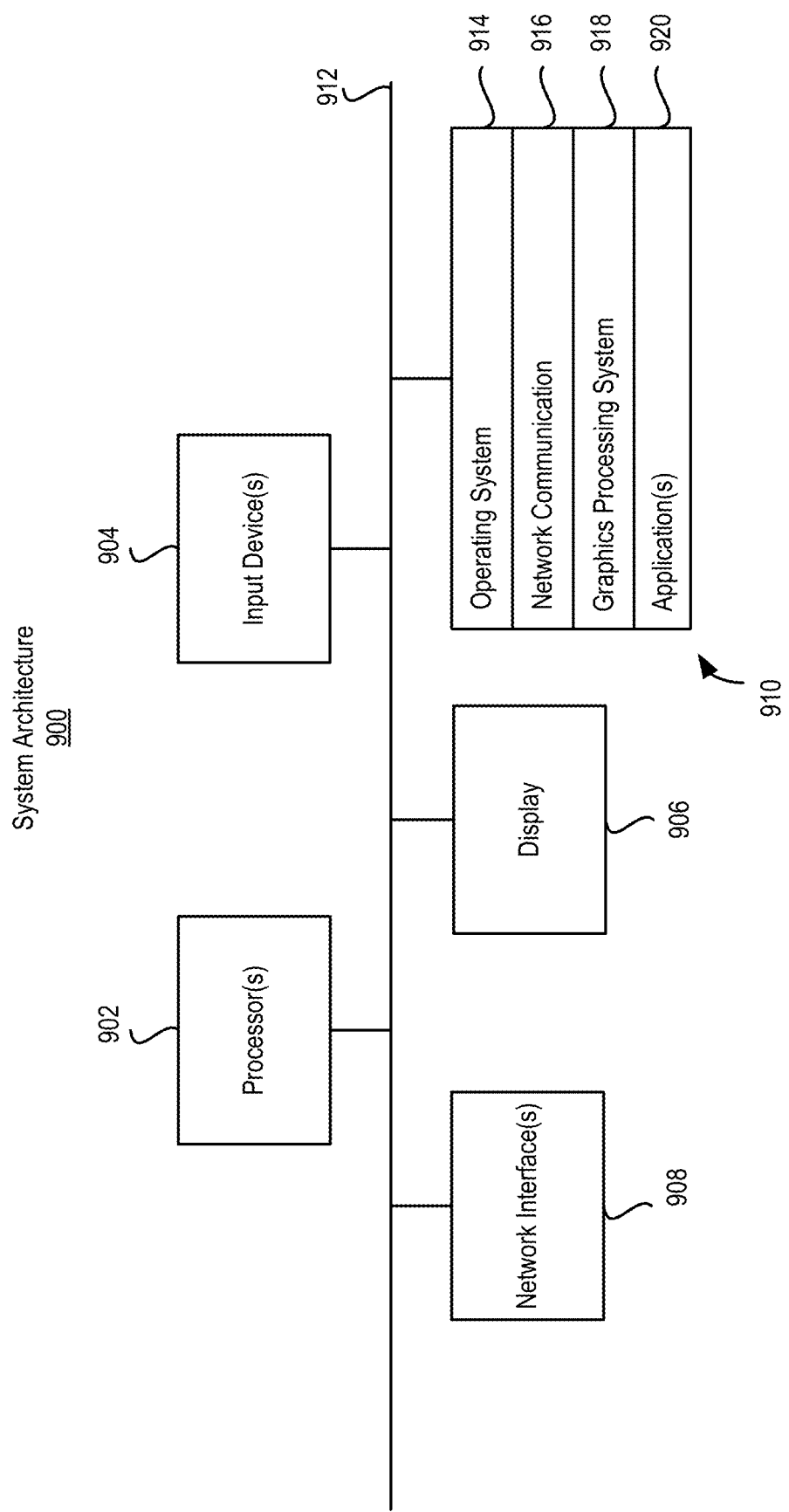
FIG. 9 is a block diagram of an exemplary system architecture of an electronic device implementing the features and operations described in reference to FIGS. 1-8.

FIG. 9 is a block diagram of an exemplary system architecture of an electronic device implementing the features and processes of FIGS. 1-8. The architecture 900 can be implemented on any electronic device that runs software applications derived from compiled instructions, including without limitation personal computers, servers, smart phones, media players, electronic tablets, game consoles, email devices, etc. In some implementations, the architecture 900 can include one or more processors 902, one or more input devices 904, one or more display devices 906, one or more network interfaces 908 and one or more computer-readable mediums 910. Each of these components can be coupled by bus 912.

Display device 906 can be any known display technology, including but not limited to display devices using Liquid Crystal Display (LCD) or Light Emitting Diode (LED) technology. Processor(s) 902 can use any known processor technology, including but are not limited to graphics processors and multi-core processors.

Input device 904 can be any known input device technology, including but not limited to a keyboard (including a virtual keyboard), mouse, track ball, and touch-sensitive pad or display. In some implementations, the input device 904 could include a microphone that facilitates voice-enabled functions, such as speech-to-text, speaker recognition, voice replication, digital recording, and telephony functions. The input device 904 can be configured to facilitate processing voice commands, voice printing and voice authentication. In some implementations, audio recorded by the input device 904 is transmitted to an external resource for processing. For example, voice commands recorded by the input device 904 may be transmitted to a network resource such as a network server which performs voice recognition on the voice commands.

Bus 912 can be any known internal or external bus technology, including but not limited to ISA, EISA, PCI, PCI Express, NuBus, USB, Serial ATA or FireWire.

Computer-readable medium 910 can be any medium that participates in providing instructions to processor(s) 902 for execution, including without limitation, non-volatile storage media (e.g., optical disks, magnetic disks, flash drives, etc.) or volatile media (e.g., SDRAM, ROM, etc.).

Computer-readable medium 910 can include various instructions 914 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 904; sending output to display device 906; keeping track of files and directories on computer-readable medium 910; controlling peripheral devices (e.g., disk drives, printers, etc.) which can be controlled directly or through an I/O controller; and managing traffic on bus 912. Network communications instructions 916 can establish and maintain network connections (e.g., software for implementing communication protocols, such as TCP/IP, HTTP, Ethernet, etc.).

A graphics processing system 918 can include instructions that provide graphics and image processing capabilities. For example, the graphics processing system 918 can implement the processes described with reference to FIGS. 1-8.

Application(s) 920 can be an application that uses or implements the processes described in reference to FIGS. 1-8. The processes can also be implemented in operating system 914.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result.

A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Example Mobile Device Architecture

Figure 10:
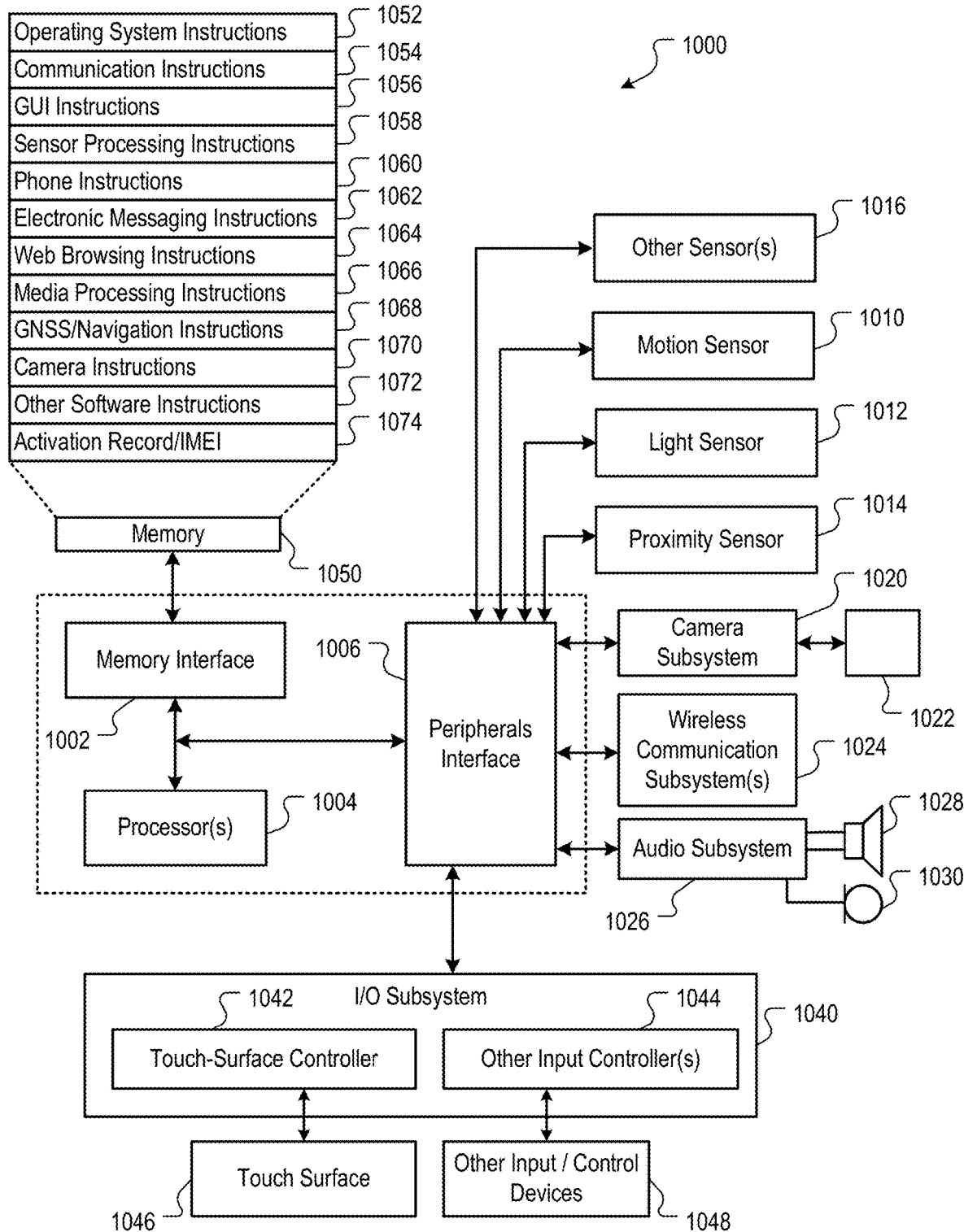
FIG. 10 is a block diagram of an exemplary device architecture of a computing device implementing the features and operations described in reference to FIGS. 1-8.

FIG. 10 is a block diagram of an exemplary device architecture of a computing device 1000, such as a mobile device, that can implement the features and operations described in reference to FIGS. 1-8. For example, the survey device (102 of FIG. 1) and/or the mobile device (112 of FIG. 1) may be examples of the computing device 1000. The computing device 1000 can include a memory interface 1002, one or more data processors, image processors and/or central processing units 1004, and a peripherals interface 1006. The memory interface 1002, the one or more processors 1004 and/or the peripherals interface 1006 can be separate components or can be integrated in one or more integrated circuits. The various components in the computing device 1000 can be coupled by one or more communication buses or signal lines.

Sensors, devices, and subsystems can be coupled to the peripherals interface 1006 to facilitate multiple functionalities. For example, motion sensor(s) 1010 (e.g., accelerometer, gyroscope, magnetometer), a light sensor 1012, and a proximity sensor 1014 can be coupled to the peripherals interface 1006 to facilitate orientation, lighting, and proximity functions. Other sensors 1016 can also be connected to the peripherals interface 1006, such as a global navigation satellite system (GNSS) (e.g., GPS receiver), a temperature sensor, barometric pressure sensor, a biometric sensor or other sensing device, to facilitate related functionalities. The motion sensor(s) 1010 can provide sensor data (e.g., acceleration data, angular rate data) to a digital pedometer application for counting steps or step frequency. A magnetometer can provide input (e.g., magnetic north) to a compass application that can compute a heading or direction of device travel.

A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips. The camera subsystem 1020 and the optical sensor 1022 can be used to collect images of a user to be used during authentication of a user, e.g., by performing facial recognition analysis.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which the computing device 1000 is intended to operate. For example, the computing device 1000 can include communication subsystems 1024 designed to operate over a GSM network, a GPRS network, an EDGE network, a WiFi or WiMax network, and a Bluetooth™ network. In particular, the wireless communication subsystems 1024 can include hosting protocols such that the device 1000 can be configured as a base station for other wireless devices. The wireless communication subsystems 1024 can receive radio frequency (RF) signals from wireless network access points (e.g., WiFi scans), cell towers or other devices and compute signal strength metrics, such as, for example, RSSI values.

An audio subsystem 1026 can be coupled to a speaker 1028 and a microphone 1030 to facilitate voice-enabled functions, such as speaker recognition, voice replication, digital recording, and telephony functions. The audio subsystem 1026 can be configured to facilitate processing voice commands, voiceprinting and voice authentication. In some implementations, the microphone 1030 facilitates voice-enabled functions, such as speech-to-text, speaker recognition, voice replication, digital recording, and telephony functions. The audio subsystem 1026 can be configured to facilitate processing voice commands, voiceprinting and voice authentication. In some implementations, audio recorded by the audio subsystem 1026 is transmitted to an external resource for processing. For example, voice commands recorded by the audio subsystem 1026 may be transmitted to a network resource such as a network server which performs voice recognition on the voice commands.

The I/O subsystem 1040 can include a touch-surface controller 1042 and/or other input controller(s) 1044. The touch-surface controller 1042 can be coupled to a touch surface 1046. The touch surface 1046 and touch-surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of the speaker 1028 and/or the microphone 1030.

In one implementation, a pressing of the button for a first duration can disengage a lock of the touch surface 1046; and a pressing of the button for a second duration that is longer than the first duration can turn power to the computing device 1000 on or off. Pressing the button for a third duration can activate a voice control, or voice command, module that enables the user to speak commands into the microphone 1030 to cause the device to execute the spoken command. The user can customize a functionality of one or more of the buttons. The touch surface 1046 can, for example, also be used to implement virtual or soft buttons and/or a keyboard.

In some implementations, the computing device 1000 can present recorded audio and/or video files, such as MP3, AAC, and MPEG files. In some implementations, the computing device 1000 can include the functionality of an MP3 player, such as an iPod™. The computing device 1000 can, therefore, include a 36-pin connector that is compatible with the iPod. Other input/output and control devices can also be used.

The memory interface 1002 can be coupled to memory 1050. The memory 1050 can include high-speed random access memory and/or non-volatile memory, such as one or more magnetic disk storage devices, one or more optical storage devices, and/or flash memory (e.g., NAND, NOR). The memory 1050 can store an operating system 1052, such as Darwin, RTXC, LINUX, UNIX, OS X, WINDOWS, or an embedded operating system such as VxWorks.

The operating system 1052 can include instructions for handling basic system services and for performing hardware dependent tasks. In some implementations, the operating system 1052 can be a kernel (e.g., UNIX kernel). In some implementations, the operating system 1052 can include instructions for performing voice authentication. For example, operating system 1052 can implement security lockout and voice authentication features.

The memory 1050 can also store communication instructions 1054 to facilitate communicating with one or more additional devices, one or more computers and/or one or more servers. The memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GNSS/Navigation instructions 1068 to facilitate GNSS and navigation-related processes and functions; and/or camera instructions 1070 to facilitate camera-related processes and functions.

The memory 1050 can store other software instructions 1072 to facilitate other processes and functions, such as security and/or authentication processes and functions. For example, the software instructions can include instructions for performing voice authentication on per application or per feature basis and for allowing a user to configure authentication requirements of each application or feature available on a device.

The memory 1050 can also store other software instructions (not shown), such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) 1074 or similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions of the computing device 1000 can be implemented in hardware and/or in software, including in one or more signal processing and/or application specific integrated circuits.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method comprising:
  receiving, by one or more processors, a first set of trace data from a first mobile device operating in an environment, the first set of trace data describing a first set of states of a first trajectory of the first mobile device in the environment, the first set of trace data including a first set of wireless access point data and a first set of sensor measurements collected by the first mobile device while operating in the environment;

receiving, by the one or more processors, a second set of trace data from a second mobile device operating in the environment, the second set of trace data describing a second set of states of a second trajectory of the second mobile device in the environment, the second set of trace data including a second set of wireless access point data and a second set of sensor measurements collected by the second mobile device while operating in the environment;

determining, by the one or more processors, a first location constraint based on at least one of the first or second set of sensor measurements, wherein the first location constraint is a measurement constraint for sensor measurements based on a difference between distance and heading measurements between states in at least one of the first or second set of states;

determining, by the one or more processors, a second location constraint based on a similarity between the first and second sets of wireless access point data, wherein the second location constraint is a first loop constraint for graph simultaneous localization and mapping, wherein the second location constraint comprises a covariance term in one or more posterior probabilities, wherein determining a similarity between the first and second sets of wireless access point data further comprises:

grouping the first and second sets of wireless access point data into a time window;

computing a distance between the first and second sets of wireless access point data;

comparing the distance with a threshold value; and generating the second location constraint based on a result of the comparing; and generating, via graph simultaneous localization and mapping performed by the one or more processors, a radio map based on the first and second location constraints.

2. The method of claim 1, further comprising:
determining, by the one or more processors, a third location constraint based on a location fix, wherein the third location constraint is a landmark constraint for simultaneous localization and mapping; and
generating, by the one or more processors, a radio map based on the first, second and third location constraints.

3. The method of claim 2, further comprising:
determining, by the one or more processors, a fourth location constraint based on a floor transition event and at least one of the first or second set of sensor measurements, wherein the fourth location constraint is a second loop constraint for simultaneous localization and mapping; and
generating, by the one or more processors, a radio map based on the first, second, third and fourth location constraints.

4. The method of claim 3, wherein the first, second, third, and fourth location constraints are constraints in respective sets of first, second, third and fourth constraints, each constraint in the respective sets of first, second, third and fourth constraints comprise a covariance term in one or more posterior probabilities, and the covariance term is fixed for each constraint within a set of the respective sets of first, second, third and fourth constraints.

5. The method of claim 3, wherein determining the fourth location constraint further comprises:
detecting a floor transition period for the first and second sets of trace data;
for each floor transition pair detected in the first and second sets of trace data, computing a normalized distance between the first and second sets of wireless access point data using dynamic time warping and a distance function; and
for any floor transition pair having a distance that is lower than a specified threshold value, generating the fourth location constraint.

6. The method of claim 1, wherein the first or second sets of sensor measurements include at least one of pedometer data or pressure data.

7. The method of claim 1, wherein the distance is a computed by combining a Jaccard distance and a Euclidean distance.

8. The method of claim 1, further comprising:
determining a second location constraint based on signal strength measurements in the first or second sets of wireless access point data, further comprises:
comparing the signal strength measurements to a threshold value; and
generating the second location constraint based on a result of the comparing.

9. The method of claim 1, wherein the first and second sets of trace data each include at least latitude, longitude, and heading.

10. A system comprising:
one or more processors;
memory storing instructions that when executed by the one or more processors, causes the one or more processors to perform operations comprising:
receiving a first set of trace data from a first mobile device operating in an environment, the first set of trace data describing a first set of states of a first trajectory of the first mobile device in the environment, the first set of trace data including a first set of wireless access point data and a first set of sensor measurements collected by the first mobile device while operating in the environment;
receiving a second set of trace data from a second mobile device operating in the environment, the second set of trace data describing a second set of states of a second trajectory of the second mobile device in the environment, the second set of trace data including a second set of wireless access point data and a second set of sensor measurements collected by the second mobile device while operating in the environment;
determining a first location constraint based on at least one of the first or second set of sensor measurements, wherein the first location constraint is a measurement constraint for sensor measurements based on a difference between distance and heading measurements between states in at least one of the first or second set of states;
determining a second location constraint based on a similarity between the first and second sets of wireless access point data, wherein the second location constraint is a first loop constraint for graph simultaneous localization and mapping, wherein the second location constraint comprises a covariance term in one or more posterior probabilities, wherein determining a similarity between the first and second sets of wireless access point data further comprises:

grouping the first and second sets of wireless access point data into a time window;

computing a distance between the first and second sets of wireless access point data;

comparing the distance with a threshold value; and generating the second location constraint based on a result of the comparing; and generating, via graph simultaneous localization and mapping, a radio map based on the first and second location constraints.

11. The system of claim 10, further comprising:

determining a third location constraint based on a location fix, wherein the third location constraint is a landmark constraint for simultaneous localization and mapping; and generating a radio map based on the first, second and third location constraints.

12. The system of claim 11, further comprising:

determining a fourth location constraint based on a floor transition event and at least one of the first or second set of sensor measurements, wherein the fourth location constraint is a second loop constraint for simultaneous localization and mapping; and generating a radio map based on the first, second, third and fourth location constraints.

13. The system of claim 12, wherein the first, second, third, and fourth location constraints are constraints in respective sets of first, second, third and fourth constraints, each constraint in the respective sets of first, second, third and fourth constraints comprise a covariance term in one or more posterior probabilities, and the covariance term is a fixed value for each constraint within a set for the respective sets of first, second, third and fourth constraints.

14. The system of claim 12, wherein determining the fourth location constraint further comprises:

detecting a floor transition period for the first and second sets of trace data;

for each floor transition pair detected in the first and second sets of trace data, computing a normalized distance between the first and second sets of wireless access point data using dynamic time warping and a distance function; and for any floor transition pair having a distance that is lower than a specified threshold value, generating the fourth location constraint.

15. The system of claim 10, wherein the first or second sets of sensor measurements include at least one of pedometer data or pressure data.

16. The system of claim 1, wherein the distance is a computed by combining a Jaccard distance and a Euclidean distance.

17. The system of claim 10, further causes the one or more processors to perform operations comprising:

determining a second location constraint based on signal strength measurements in the first or second sets of wireless access point data, further comprises:

comparing the signal strength measurements to a threshold value; and generating the second location constraint based on a result of the comparing.

18. The system of claim 10, wherein the first and second sets of trace data each include at least latitude, longitude, and heading.

* * * * *